(12) United States Patent
Yun

(10) Patent No.: US 9,747,019 B2
(45) Date of Patent: Aug. 29, 2017

(54) MOBILE TERMINAL AND CONTROL METHOD THEREOF

(71) Applicant: LG ELECTRONICS INC., Seoul (KR)

(72) Inventor: Yeerang Yun, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 840 days.

(21) Appl. No.: 13/658,579

(22) Filed: Oct. 23, 2012

(65) Prior Publication Data

US 2013/0222283 A1 Aug. 29, 2013

(30) Foreign Application Priority Data

Feb. 24, 2012 (KR) .................... 10-2012-0019321
Feb. 24, 2012 (KR) .................... 10-2012-0019323

(51) Int. Cl.
| | | |
|---|---|---|
| G06F 3/044 | (2006.01) | |
| G06F 3/0488 | (2013.01) | |
| G06F 17/24 | (2006.01) | |
| G06F 3/0483 | (2013.01) | |
| G06F 3/0486 | (2013.01) | |
| H04M 1/725 | (2006.01) | |

(52) U.S. Cl.
CPC .......... *G06F 3/0488* (2013.01); *G06F 3/0483* (2013.01); *G06F 3/0486* (2013.01); *G06F 17/24* (2013.01); *G06F 3/044* (2013.01); *H04M 1/72519* (2013.01); *H04M 2250/22* (2013.01)

(58) Field of Classification Search
CPC ...................................... G06F 3/041

USPC .......................................................... 345/173
See application file for complete search history.

(56) References Cited

U.S. PATENT DOCUMENTS

| | | | |
|---|---|---|---|
| 2002/0011990 A1 | 1/2002 | Anwar | |
| 2005/0183026 A1* | 8/2005 | Amano ................. | G06F 1/1616 715/764 |
| 2005/0192924 A1 | 9/2005 | Drucker et al. | |
| 2007/0120832 A1* | 5/2007 | Saarinen ............... | G06F 3/0485 345/173 |
| 2008/0122796 A1* | 5/2008 | Jobs ...................... | G06F 3/0488 345/173 |

(Continued)

FOREIGN PATENT DOCUMENTS

| | | |
|---|---|---|
| EP | 2284679 A2 | 2/2011 |
| KR | 10-2005-0070245 A | 7/2005 |

(Continued)

*Primary Examiner* — Jennifer Mehmood
*Assistant Examiner* — Carl Adams
(74) *Attorney, Agent, or Firm* — Birch, Stewart, Kolasch & Birch, LLP

(57) ABSTRACT

The present disclosure relates to a mobile terminal, and more particularly, to a mobile terminal and a control method thereof capable of a touch input. A mobile terminal according to an embodiment of the present disclosure may include a display unit configured to display a page of an electronic note and display a thumbnail image corresponding to another page along with the page; a sensing unit configured to sense a touch input on the display unit; and a controller configured to display a page corresponding to the thumbnail image or execute an edit mode for editing at least one of the page and the thumbnail image based on a kind of touch input on the thumbnail image.

11 Claims, 33 Drawing Sheets

(56) References Cited

U.S. PATENT DOCUMENTS

| | | | |
|---|---|---|---|
| 2008/0126967 A1 | 5/2008 | Lusen et al. | |
| 2008/0235563 A1* | 9/2008 | Nakamura | G06F 3/0483 715/200 |
| 2010/0058214 A1 | 3/2010 | Singh et al. | |
| 2010/0241979 A1* | 9/2010 | Apted | G06F 3/0481 715/765 |
| 2011/0016429 A1* | 1/2011 | Yoshihama | G06F 17/30899 715/838 |
| 2011/0105193 A1* | 5/2011 | Lee | G06F 3/0488 455/566 |
| 2011/0209080 A1 | 8/2011 | Bamford et al. | |
| 2012/0169768 A1* | 7/2012 | Roth | G06F 3/0485 345/629 |
| 2012/0173227 A1* | 7/2012 | Ryu | G06K 9/00442 704/9 |
| 2012/0198384 A1* | 8/2012 | Kumamoto | G06F 3/04855 715/786 |

FOREIGN PATENT DOCUMENTS

| | | |
|---|---|---|
| KR | 10-2005-0070350 A | 7/2005 |
| KR | 10-2006-0042065 A | 5/2006 |
| KR | 10-2007-0007213 A | 1/2007 |
| WO | WO 01/44915 A2 | 6/2001 |
| WO | WO 2011/026739 A1 | 3/2011 |

\* cited by examiner

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Application Nos. 10-2012-0019321 and 10-2012-0019323, filed on Feb. 24, 2012, the contents of which are incorporated by reference herein in its entirety.

BACKGROUND OF THE INVENTION

1. Field of the Invention

The present disclosure relates to a mobile terminal, and more particularly, to a mobile terminal and a control method thereof capable of a touch input.

2. Description of the Related Art

Terminals can be classified into mobile or portable terminals and a stationary terminals based on its mobility. Furthermore, the mobile terminals can be further classified into handheld terminals and vehicle mount terminals based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

Owing to the enhancement, a terminal may have an electronic note view function. However, when one page of the electronic note is displayed on the screen of the terminal, it has an inconvenience that a user is unable to view the content of the previous or next page in advance.

Accordingly, the user has difficulty in editing a current page using the previous or next page of the electronic note. Furthermore, when electronic note lists are displayed on the screen of the terminal, the user has difficulty in editing the configuration of an electronic note using the electronic note lists.

SUMMARY OF THE INVENTION

An objective of the present disclosure is to provide a mobile terminal and control method thereof capable of enhancing the user's convenience in displaying an electronic note.

A mobile terminal according to an embodiment of the present disclosure may include a display unit configured to display a page of an electronic note and display a thumbnail image corresponding to another page along with the page; a sensing unit configured to sense a touch input on the display unit; and a controller configured to display a page corresponding to the thumbnail image or execute an edit mode for editing at least one of the page and the thumbnail image based on a kind of touch input on the thumbnail image.

According to an embodiment, the controller may edit either one of the page and the thumbnail image using the other one when the edit mode is executed.

According to an embodiment, the controller may edit a page corresponding to the thumbnail image when the thumbnail image is edited.

According to an embodiment, the controller may display a page corresponding to the thumbnail image along with the page based on a touch input on the thumbnail image.

According to an embodiment, the controller may configure a first and a second screen region based on a touch input on the thumbnail image, and display a page corresponding to the thumbnail image and the page in the first and the second screen region, respectively, or generate a popup window in a state that the page is displayed, and display a page corresponding to the thumbnail image on the popup window.

According to an embodiment, when a drag input is received in the direction of the thumbnail image subsequent to selecting at least a partial region of the page, the controller may copy the selected region to the thumbnail image.

According to an embodiment, when the selected region is copied to the thumbnail image, the controller may change a size of the thumbnail image for a predetermined period of time, and display an object indicating that the selected region is copied to the thumbnail image on the thumbnail image.

According to an embodiment, when a drag input is received in the direction of the thumbnail image subsequent to selecting at least a partial region of the page, the controller may generate a thumbnail image corresponding to the selected region, and change at least one of the size and transparency of the generated thumbnail image while receiving the drag input.

According to an embodiment, when a drag input is received in the direction of the page subsequent to selecting the thumbnail image, the controller may copy the thumbnail image to the page.

According to an embodiment, when a drag input is received in the direction of the page subsequent to selecting the thumbnail image, the controller may generate another thumbnail image corresponding to the thumbnail image, and change at least one of the size and transparency of the generated another thumbnail image while receiving the drag input.

According to an embodiment, the display unit may display an object indicating a page number of the page, and the controller may display a plurality of thumbnail images corresponding to each of the plurality of different pages based on a touch input on at least one of the object and the thumbnail image.

According to an embodiment, the controller may enlarge the size of the plurality of thumbnail images when a first and a second touch position of the touch input on the plurality of thumbnail images are sensed to move in the directions of being far away from each other, and reduce the size of the plurality of thumbnail images when the first and the second touch position of the touch input are sensed to move in the directions of drawing closer to each other.

According to an embodiment, the controller may overlap the selected thumbnail images based on a touch input on at least two of the plurality of thumbnail images.

According to an embodiment, the controller may restore the overlapped thumbnail images when a touch input on the overlapped thumbnail images is sensed in a state that the selected thumbnail images are overlapped with one another.

According to an embodiment, the controller may change an arrangement order of the plurality of thumbnail images based on a touch input on at least one of the plurality of thumbnail images.

According to an embodiment, the controller may remove at least one of the plurality of thumbnail images based on a touch input on at least one of the plurality of thumbnail images.

According to an embodiment, the display unit may display a thumbnail image corresponding to a front cover of the electronic note or a thumbnail image corresponding to an electronic bookshelf containing the electronic note along with the page when the page is the first page, and display a thumbnail image corresponding to a back cover of the electronic note, a thumbnail image corresponding to a front cover of another electronic note or a thumbnail image corresponding to the electronic bookshelf along with the page when the page is the last page.

According to an embodiment, the display unit may display an object corresponding to the function of generating a new page along with the page, and the controller may generate the previous page or next page of the page based on a touch input on the object.

A control method of a mobile terminal according to an embodiment of the present disclosure may include displaying a page of an electronic note on the display unit; displaying a thumbnail image corresponding to another page along with the page on the display unit; sensing a touch input on the display unit; and displaying a page corresponding to the thumbnail image or executing an edit mode for editing at least one of the page and the thumbnail image based on a kind of touch input on the thumbnail image.

According to an embodiment, said executing an edit mode for editing at least one of the page and the thumbnail image may include editing either one of the page and the thumbnail image using the other one when the edit mode is executed.

According to an embodiment, said editing either one of the page and the thumbnail image using the other one may include editing a page corresponding to the thumbnail image when the thumbnail image is edited.

A mobile terminal according to an embodiment of the present disclosure may include a display unit configured to display an electronic bookshelf and at least one electronic note contained in the electronic bookshelf; a sensing unit configured to sense a touch input on the display unit; and a controller configured to execute the selected electronic note or edit the configuration of the electronic bookshelf based on a kind of touch input on the electronic note.

According to an embodiment, the controller may merge the selected electronic notes based on a touch input on at least two of the plurality of electronic notes.

According to an embodiment, when a drag input is received in the direction of a second electronic note subsequent to selecting a first electronic note to merge the selected electronic notes, the controller may instantaneously change the size of the second electronic note, and display an object indicating that the first electronic note is merged into the second electronic note on the second electronic note.

According to an embodiment, the controller may change at least one of the size and transparency of the first electronic note while receiving a drag input in the direction of the second electronic note subsequent to selecting the first electronic note.

According to an embodiment, when a touch input on the merged electronic notes is sensed in a state that the selected electronic notes are merged, the controller may restore the merged electronic notes.

According to an embodiment, the sensing unit may sense the movement of a terminal body, and the controller may change an arrangement order of the plurality of electronic notes or removes at least one of the plurality of electronic notes based on a touch input on at least one of the plurality of electronic notes or the movement of the terminal body.

According to an embodiment, the display unit may display an object corresponding to the function of removing an electronic note along with the electronic bookshelf, and the controller may remove the selected electronic note when receiving a drag input in the direction of the object subsequent to selecting at least one of the plurality of electronic notes.

According to an embodiment, the controller may display a cover of the electronic note in the electronic bookshelf when the cover of the electronic note is specified, and display a thumbnail image corresponding to a page of the electronic note in the electronic bookshelf when the cover thereof is not specified.

According to an embodiment, at least one of a thumbnail image corresponding to a recently displayed page of the electronic note, information associated with the electronic note, and a bookmark list may be displayed on the cover.

According to an embodiment, the controller may control the graphic information of the cover based on a use frequency of the electronic note.

According to an embodiment, when the selected electronic note is executed based on a touch input on the selected electronic note, the controller may display a page of the selected electronic note within a region being displayed with the selected electronic note.

According to an embodiment, when a touch input for the page turn of the electronic note is sensed, the controller may display an animation effect corresponding to the page turn in a three-dimensional stereoscopic image.

According to an embodiment, the display unit may display an object corresponding to the function of generating a new electronic note along with the electronic bookshelf, and the controller may generate a new electronic note and displays the generated electronic note along with the electronic bookshelf based on a touch input on the object.

According to an embodiment, when the generated electronic note contains information received from a social network service (SNS) server, the controller may display the counterpart's name, contact address or thumbnail image associated with the received information on a cover of the generated electronic note.

According to an embodiment, when new information is received from the social network service (SNS) server, the controller may display an object indicating that the new information is received on a cover of the generated electronic note.

According to an embodiment, when the display direction of the screen information displayed on the display unit is changed based on the movement of the terminal body, the controller may configure a first and a second screen region, and display the electronic bookshelf and a page of the electronic note in the first and the second screen region, respectively.

According to an embodiment, when a new electronic note is generated in a state that a predetermined number of electronic notes are contained in the electronic bookshelf, the controller may generate another electronic bookshelf to contain the new electronic note in the generated another electronic bookshelf.

A control method of a mobile terminal according to an embodiment of the present disclosure may include displaying an electronic bookshelf and at least one electronic note contained in the electronic bookshelf; sensing a touch input on the display unit; and executing the selected electronic note or editing the configuration of the electronic bookshelf based on a kind of touch input on the electronic note.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
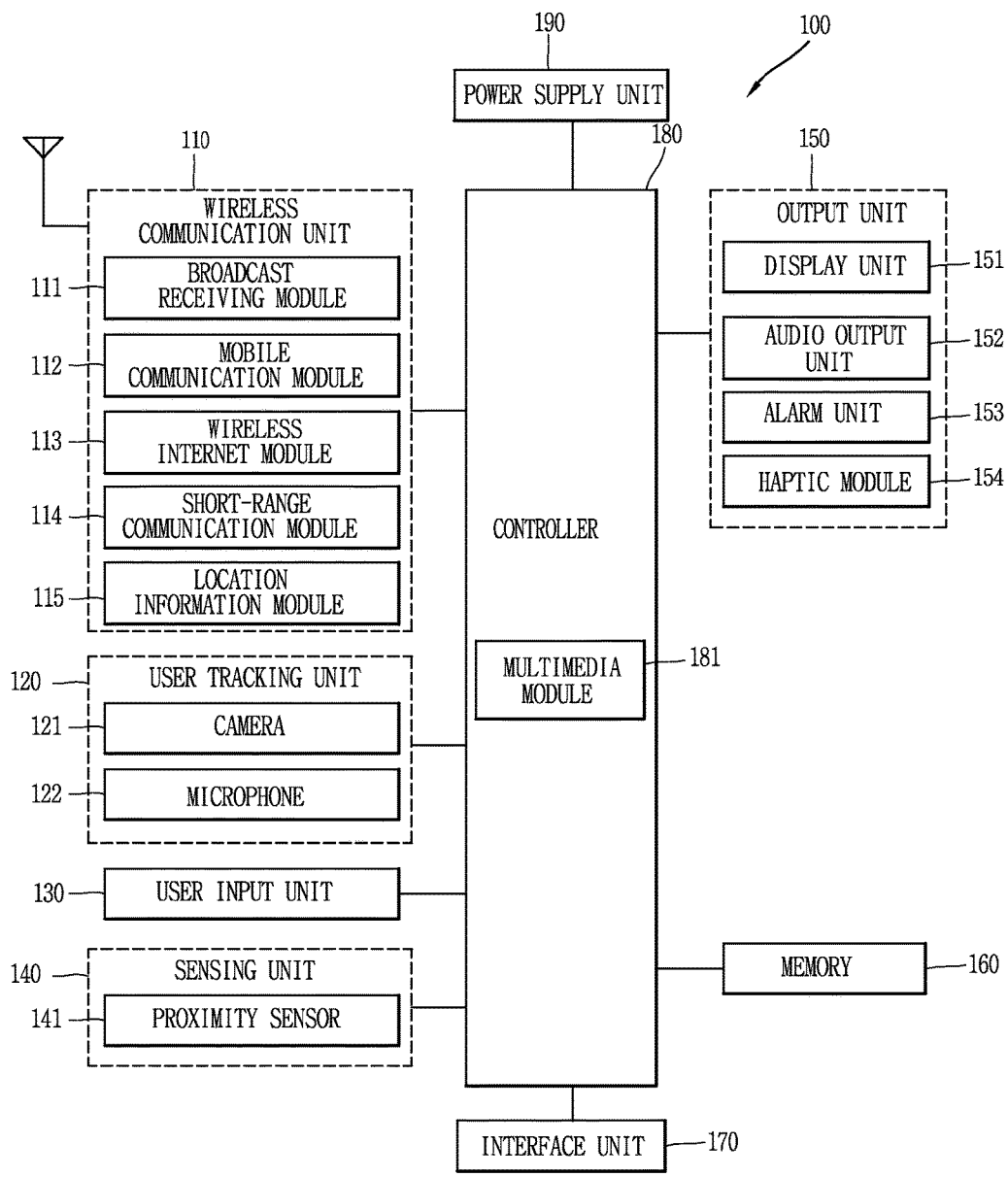
FIG. 1 is a block diagram illustrating a mobile terminal related to the present disclosure.

FIG. 1 is a block diagram illustrating a mobile terminal 100 according to an embodiment of the present disclosure. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements 110-190 of the mobile terminal 100 will be described in sequence.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Subsequently, referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of brief explanation, a behavior of closely approaching the touch screen without contact will be referred to as "proximity touch", whereas a behavior that the pointer substantially comes in contact with the touch screen will be referred to as "contact touch".

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 may generate an output related to visual, auditory, tactile senses. The output unit 150 may include a display unit 151, an audio output module 153, an alarm unit 154, a haptic module 155, and the like.

The display unit 151 may display (output) information processed in the mobile terminal 100. For example, when the mobile terminal 100 is operated in a phone call mode, the display unit 151 may display a user interface (UI) or graphic user interface (GUI) related to a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. Under this configuration, the user can view an object positioned at a rear side of the mobile device body through a region occupied by the display unit 151 of the mobile device body.

There may exist two or more display units 151 according to the implementation of the mobile terminal 100. For example, a plurality of the display units 151 may be placed on one surface in a separate or integrated manner, or may be place on different surfaces, respectively.

The audio output module 153 may output audio data received from the wireless communication unit 110 or stored in the memory 160, in a call-receiving mode, a call-placing mode, a recording mode, a voice selection mode, a broadcast reception mode, and the like. The audio output module 153 may output an audio signal related to a function carried out in the mobile terminal 100 (for example, sound alarming a call received or a message received, and the like). The audio output module 153 may include a receiver, a speaker, a buzzer, and the like.

The alarm unit 154 outputs signals notifying the occurrence of an event from the mobile terminal 100. The examples of an event occurring from the mobile terminal 100 may include a call received, a message received, a key signal input, a touch input, and the like. The alarm unit 154 may output not only video or audio signals, but also other types of signals such as signals for notifying the occurrence of an event in a vibration manner. Since the video or audio signals may be also output through the display unit 151 or the audio output unit 153, the display unit 151 and the audio output module 153 may be categorized into part of the alarm unit 153.

The haptic module 155 generates various tactile effects that can be felt by the user. A representative example of the tactile effects generated by the haptic module 155 may include vibration. Vibration generated by the haptic module 155 may have a controllable intensity, a controllable pattern, and the like. For example, different vibrations may be output in a synthesized manner or in a sequential manner.

The haptic module 155 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 155 may be configured to transmit tactile effects through the user's direct contact, or the user's muscular sense using a finger or a hand. Two or more haptic modules 155 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing related to telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described.

The user input unit 130 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

Figure 2A:
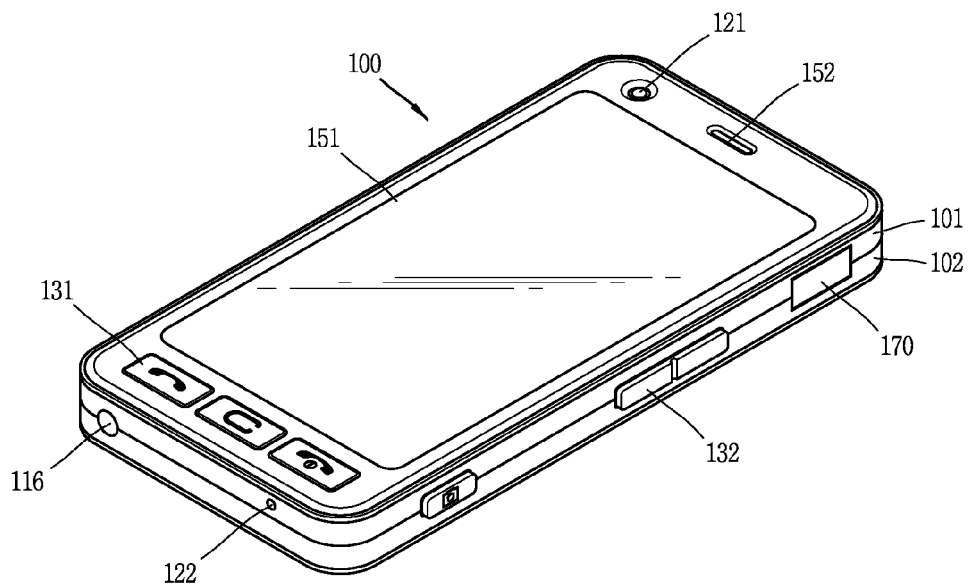
FIGS. 2A and 2B are perspective views illustrating an external appearance of the mobile terminal according to the present disclosure.
Figure 2B:
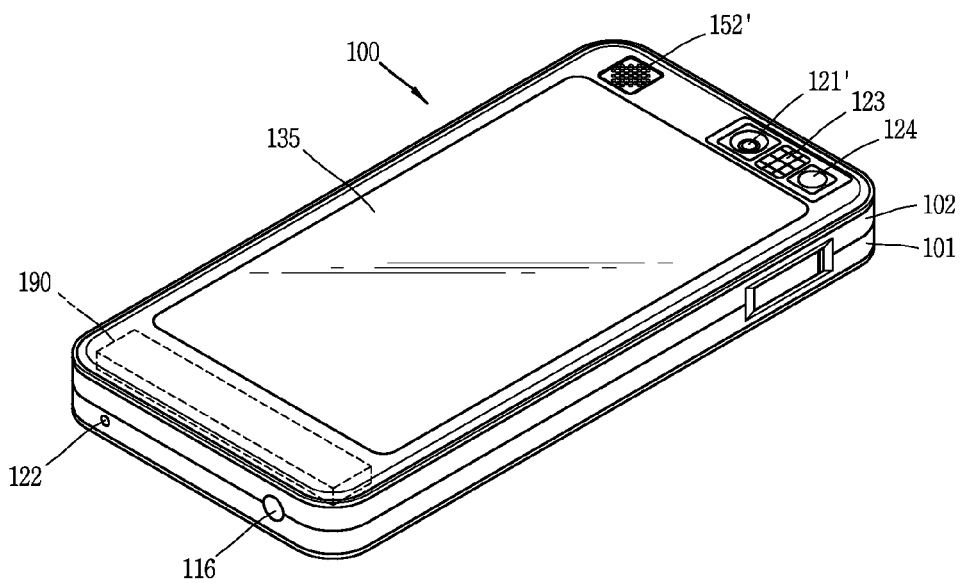

FIGS. 2A and 2B are perspective views illustrating the external appearance of a mobile terminal 100 related to the present disclosure. FIG. 2A is a front and a side view illustrating the mobile terminal 100, and FIG. 2B is a rear and the other side view illustrating the mobile terminal 100.

Referring to FIG. 2A, the mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. Various electronic components may be integrated in a space formed between the front case 101 and the rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100. The user input unit 130 may include a plurality of manipulation units 131, 132.

The manipulation units 131, 132 may receive various commands. For example, the first manipulation unit 131 may be used to receive a command, such as start, end, scroll, or the like. The second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface of the terminal body, namely, the rear case 102. The rear camera 121' has an image capturing direction, which is substantially opposite to the direction of the front camera 121 (refer to FIG. 2A), and may have different number of pixels from those of the front camera 121.

For example, that the front camera 121 may be configured to have a relatively small number of pixels, and the rear camera 121' may be configured to have a relatively large number of pixels. Accordingly, in case where the front camera 121 is used for video communication, it may be possible to reduce the size of transmission data when the user captures his or her own face and sends it to the other party in real time. On the other hand, the rear camera 121' may be used for the purpose of storing high quality images.

On the other hand, the cameras 121, 121' may be provided in the terminal body in a rotatable and popupable manner.

Furthermore, a flash 123 and a mirror 124 may be additionally disposed adjacent to the rear camera 121'. The flash 123 illuminates light toward an object when capturing the object with the camera 121'. The mirror 124 allows the user to look at his or her own face, or the like, in a reflected way when capturing himself or herself (in a self-portrait mode) by using the rear camera 121'.

Furthermore, a rear audio output unit 152' may be additionally disposed on a rear surface of the terminal body. The rear audio output unit 152' together with the front audio output unit 152 (refer to FIG. 2A) can implement a stereo function, and it may be also used to implement a speaker phone mode during a phone call.

Furthermore, an antenna 116 for receiving broadcast signals may be additionally disposed on a lateral surface of the terminal body. The antenna 116 constituting part of a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151 (refer to FIG. 2A). Alternatively, a rear display unit for displaying visual information may be additionally mounted on the touch pad 135. At this time, information displayed on the both surfaces of the front display unit 151 and rear display unit may be controlled by the touch pad 135.

The touch pad 135 may be operated in conjunction with the display unit 151 of the front case 101. The touch pad 135 may be disposed in parallel at a rear side of the display unit 151. The touch pad 135 may have the same size as or a smaller size than the display unit 151.

On the other hand, the mobile terminal 100 may have an electronic note view function. However, when one page of the electronic note is displayed on the display unit 151 of the mobile terminal 100, it has an inconvenience that a user is unable to view the content of the previous or next page in advance. Accordingly, the user has difficulty in editing a current page using the previous or next page of the electronic note. Furthermore, when electronic note lists are displayed on the display unit 151 of the mobile terminal 100, the user has difficulty in editing the configuration of an electronic note using the electronic note lists.

Accordingly, the mobile terminal 100 and control method thereof capable of enhancing the user's convenience in displaying an electronic note will be described below.

Figure 3:
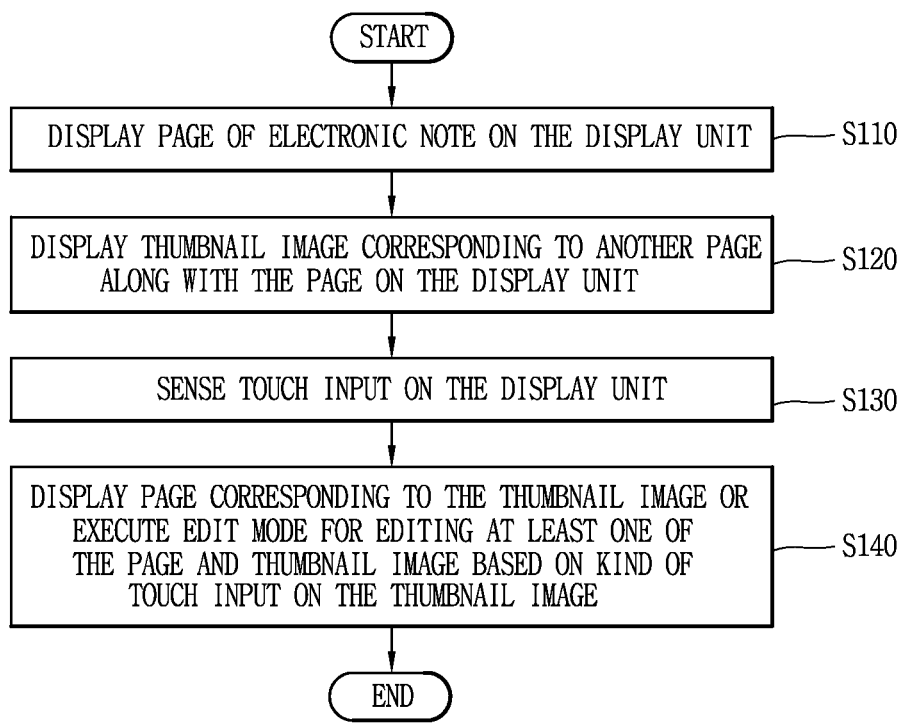
FIG. 3 is a flow chart for explaining a mobile terminal according to an embodiment of the present disclosure.

FIG. 3 is a flow chart for explaining the mobile terminal 100 (refer to FIG. 1) according to an embodiment of the present disclosure. The mobile terminal 100 may include a display unit 151 (refer to FIG. 1), a sensing unit 140 (refer to FIG. 1), and a controller 180 (refer to FIG. 1).

Referring to FIG. 3, the process of displaying a page of the electronic note on the display unit 151 (S110) is first carried out. Next, the process of displaying a thumbnail image corresponding to another page along with the page on the display unit 151 (S120) is carried out.

Specifically, the display unit 151 may display electronic notes along with an electronic bookshelf containing the electronic notes. At this time, when at least one of electronic notes is selected from the electronic bookshelf, the electronic note is carried out, and thus the display unit 151 can display a cover of the electronic note or a page of the electronic note.

On the other hand, the display unit 151 may display a pen tool for input along with the page. The pen tool may include icons corresponding to the character input, drawing input and eraser input functions, respectively. The controller 180 may execute a function (for example, execute a character input mode) corresponding to the selected icon when a first touch input on the icon (for example, an icon corresponding to a character input function) is sensed, and configure an option of the function corresponding to the selected icon (for example, configure a font) when a second touch input on the icon is sensed.

Furthermore, the display unit 151 may display thumbnail images corresponding to the previous and next pages of a page, respectively, along with the page of the electronic note. Accordingly, the user can view the content of the previous or next page in advance.

Here, an icon indicating a page number may be displayed at a lower end of the page. The thumbnail images corresponding to the previous and next pages, respectively, may be displayed at both sides of the icon, respectively. At this time, the size of a thumbnail image corresponding to the next page may be displayed larger than that of a thumbnail image corresponding to the previous page. Furthermore, at least one of the size and transparency of the thumbnail image may be changed based on a touch input on the thumbnail image.

Next, the process of sensing a touch input on the display unit 151 (S130) is carried out.

Specifically, the sensing unit 140 may sense a touch input on the display unit 151. At this time, the sensing unit 140 may sense a touch input on a predetermined region of the display unit 151 or sense a touch input on the entire region of the display unit 151.

Then, the process of displaying a page corresponding to the thumbnail image or executing an edit mode for editing at least one of the page and the thumbnail image based on a kind of touch input on the thumbnail image (S140) is carried out.

Specifically, when a touch input on the thumbnail image is sensed, the controller 180 may determine a kind of touch input on the thumbnail image.

For example, when a first touch input on the thumbnail image is sensed, the controller 180 may display a page corresponding to the thumbnail image, for example, the next page, on the display unit 151. At this time, the controller 180 may display the next page on the display unit 151 after disappearing a currently displayed page or display a currently displayed page along with the next page on the display unit 151 based on a touch input on the thumbnail image.

More specifically, the controller 180 may configure a first and a second screen region based on a touch input on the thumbnail image, and display a page corresponding to the thumbnail image and a currently displayed page in the first and the second screen region, respectively. Furthermore, the controller 180 may generate a popup window in a state that the page is displayed, and display a page corresponding to the thumbnail image on the popup window.

On the other hand, when a second touch input on the thumbnail image is sensed, the controller 180 may edit either one of the page and thumbnail image using the other one. At this time, the controller 180 may edit a page corresponding to the thumbnail image according to the editing of the thumbnail image.

Specifically, when a drag input is received in the direction of the thumbnail image subsequent to selecting at least a partial region of the page, the controller 180 may copy the selected region to the thumbnail image. At this time, as described above, as the selected region is copied to the thumbnail image, the controller 180 may also copy the selected region to a page corresponding to the thumbnail image.

Similarly, when a drag input is received in the direction of the page subsequent to selecting the thumbnail image, the controller 180 may copy the thumbnail image to the page.

As described above, according to the present disclosure, a thumbnail image corresponding to the previous or next page may be displayed along therewith in a state that a page of the electronic note is displayed on the display unit 151 of the mobile terminal 100. Accordingly, the user can view the content of the previous or next page of a currently display page in advance, and edit a currently display page using the previous or next page of the currently display page. In other words, the user may feel amusement through the editing of the electronic note. As a result, it may be possible to enhance the user's convenience.

Figure 4A:
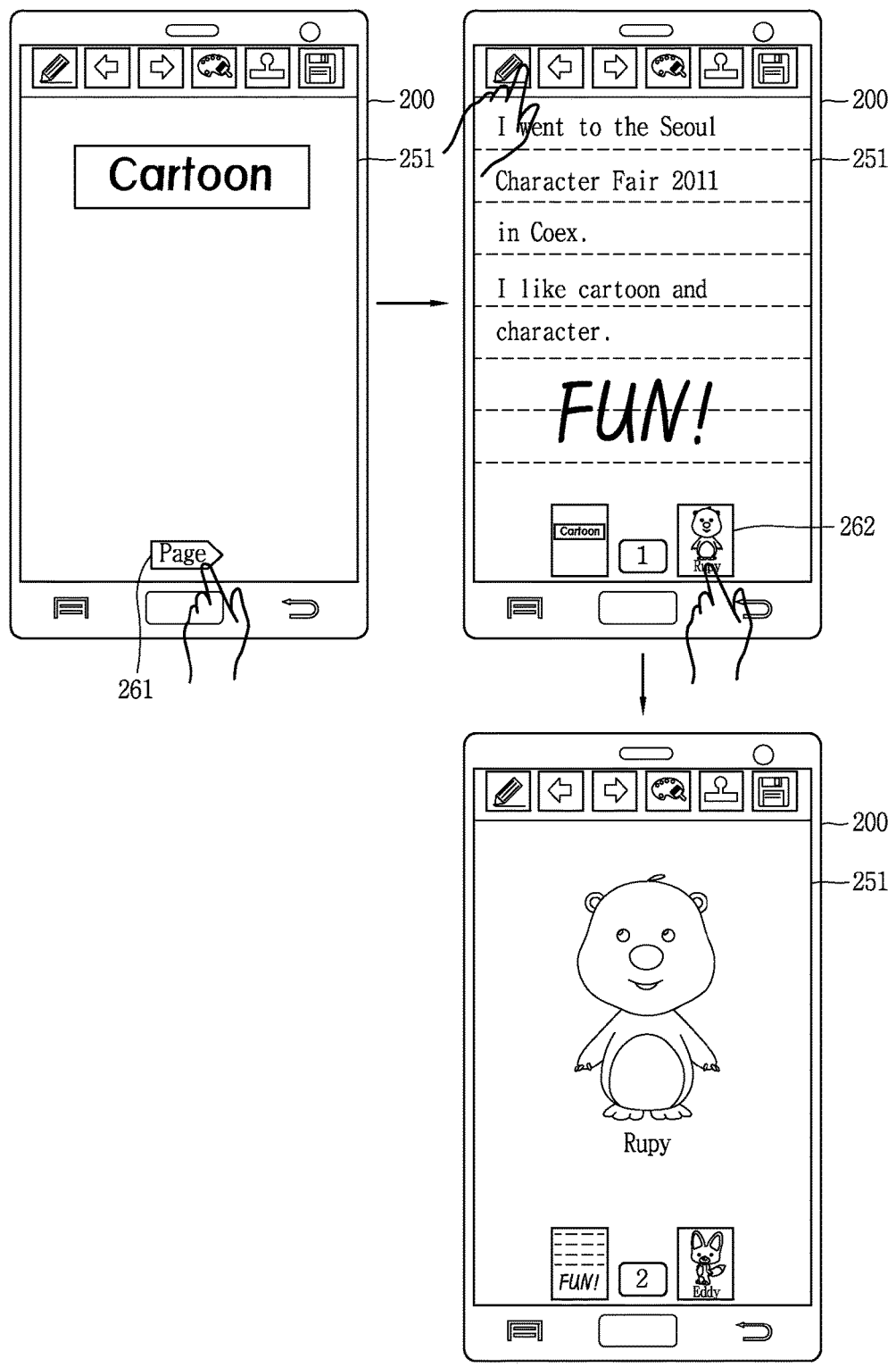
FIGS. 4A, 4B, 5, 6A, 6B, 7, 8, 9, 10, 11, 12, 13, 14, 15, 16 and 17 are conceptual views illustrating an operation example of the mobile terminal according to FIG. 3.
Figure 4B:
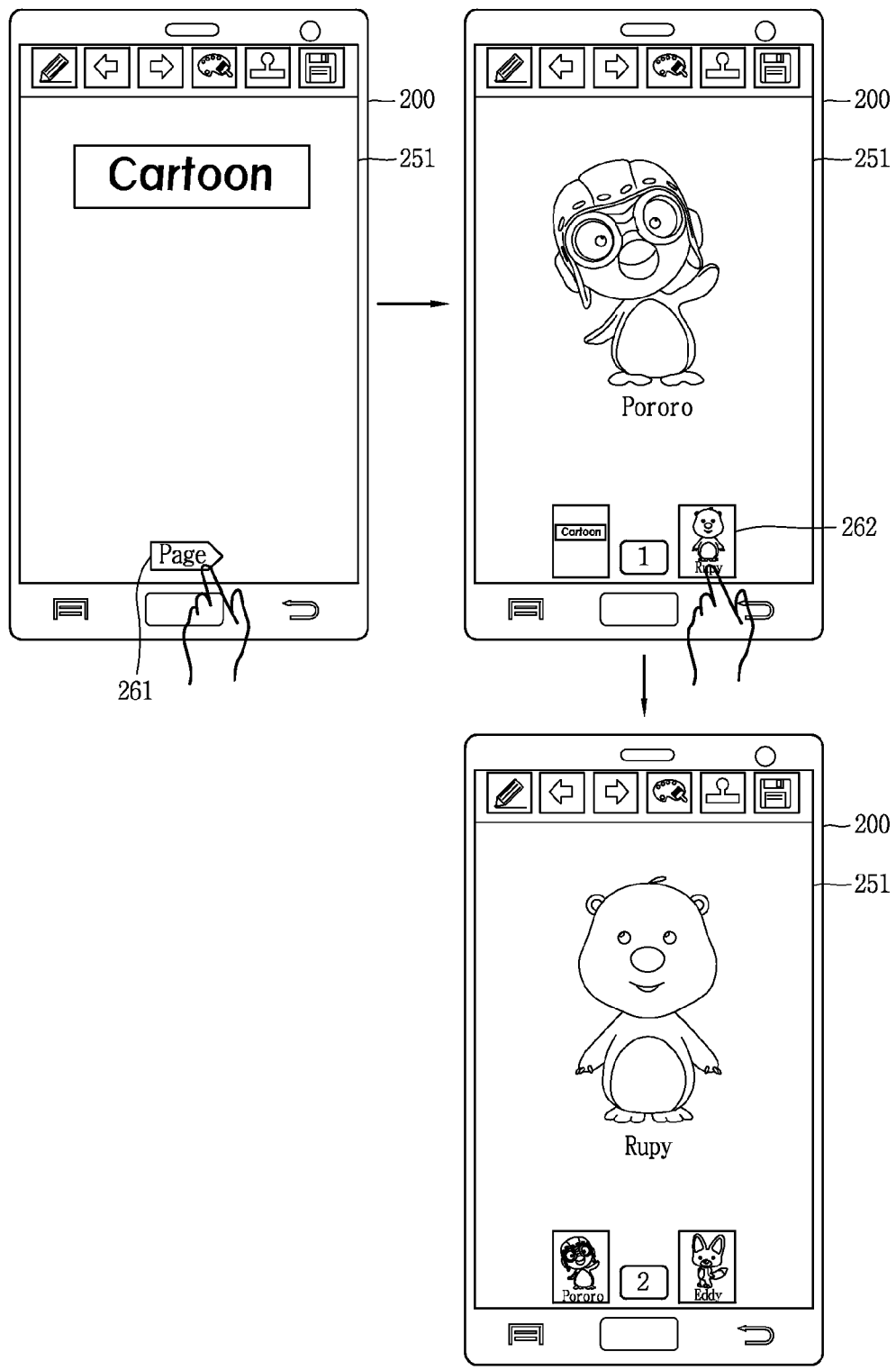
Figure 5:
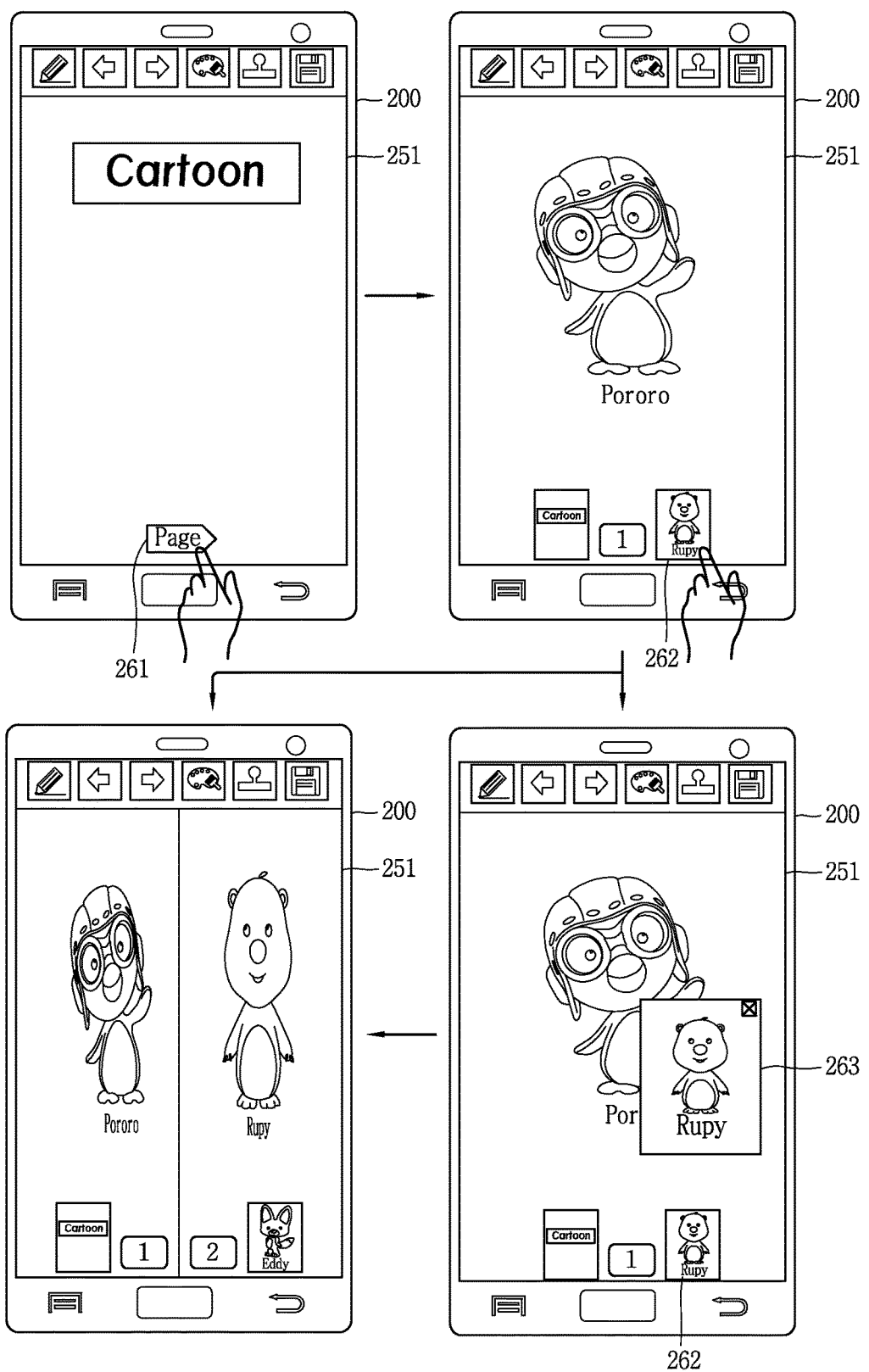

FIGS. 4A, 4B and 5 are conceptual views illustrating an operation example of the mobile terminal 200 according to FIG. 3. The mobile terminal 200 may include a display unit 251, a sensing unit 140 (refer to FIG. 1), and a controller 180 (refer to FIG. 1).

Referring to FIGS. 4A, 4B and 5, a cover of the electronic note may be displayed on the display unit 251. The cover of the electronic note may include an icon 261 corresponding to the function of displaying a page of the electronic note. At this time, the controller 180 may display a page of the electronic note on the display unit 251 in response to a touch input on the icon 261.

A pen tool for input may be displayed along with the page of the electronic note on the display unit 251. The pen tool may include icons corresponding to the character input, drawing input and eraser input functions, respectively.

As illustrated in FIG. 4A, the user may select a pen tool, and input characters using the selected pen tool. The controller 180 may recognize the input characters, and converts them into a text message to display it on a page of the electronic note, or display the input characters as they are on a page of the electronic note. The user may also select a page pattern (for example, note pattern, manuscript paper pattern, etc.) of the electronic note.

Furthermore, thumbnail images corresponding to the previous and next pages, respectively, may be displayed on the display unit 251. At this time, when the previous page is a cover of the electronic note, a thumbnail image of the cover may be displayed on the display unit 251. Accordingly, the user can view the content of the previous and next pages in advance. Then, when a touch input on the thumbnail image 262 corresponding to the next page is sensed, the controller 180 may display the next page on the display unit 251.

At this time, as illustrated in FIGS. 4A and 4B, the controller 180 may display the next page on the display unit 251 after disappearing a currently displayed page. As the next page is displayed on the display unit 251, thumbnail images corresponding to the previous and next pages, respectively, may be displayed on the display unit 251.

Though not shown in the drawing, the controller 180 may provide an animation effect, for example, turning a page, when the currently display page is disappeared and the next page is displayed. Furthermore, the controller 180 may provide another animation effect, for example, turning a cover, when the currently display page is disappeared and the first page is displayed.

On the other hand, as illustrated in FIG. 5, the controller 180 may display a currently display page along with the next page on the display unit 251. More specifically, the controller 180 may configure a first and a second screen region based on a touch input on the thumbnail image 262, and displays a currently display page and the next page in the first and the second screen region, respectively. Furthermore, the controller 180 may generate a popup window in a state that the page is displayed, and displays the next page on the popup window.

Though not shown in the drawing, as the currently display page is displayed along with the next page, the controller 180 may edit either one of the currently display page and the next page using the other one.

Figure 6A:
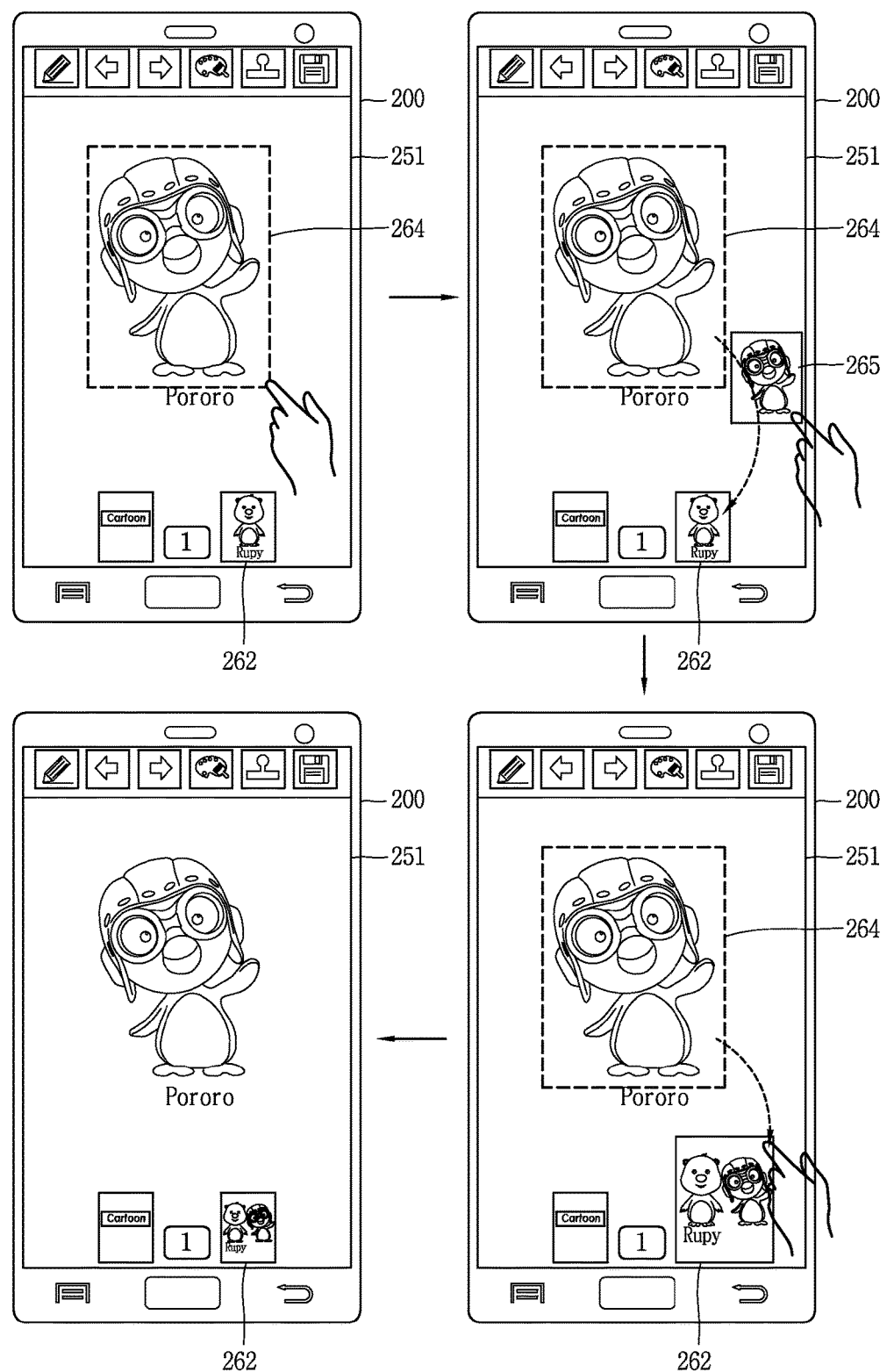
Figure 6B:
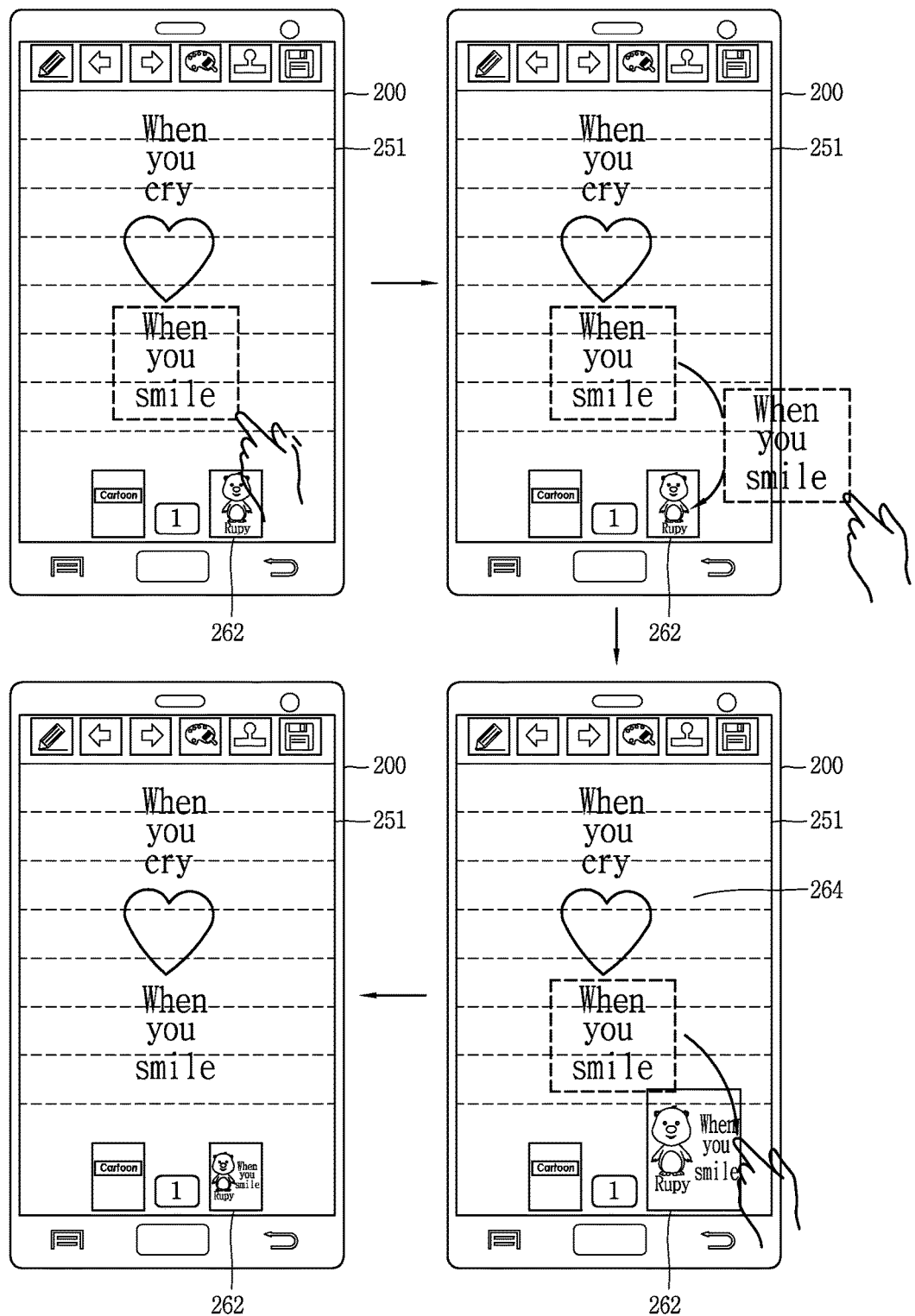
Figure 7:
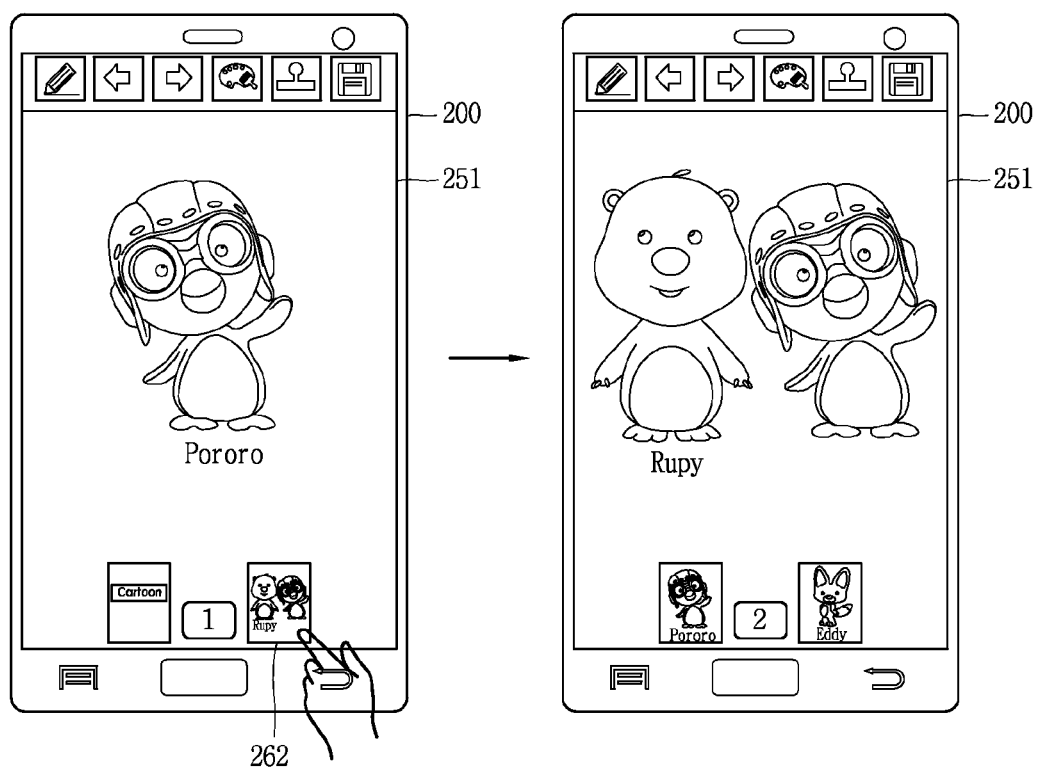

FIGS. 6A, 6B and 7 are conceptual views illustrating an operation example of the mobile terminal 200 according to FIG. 3. The mobile terminal 200 may include a display unit 251, a sensing unit 140 (refer to FIG. 1), and a controller 180 (refer to FIG. 1).

Referring to FIGS. 6A and 6B, a page of the electronic note may be displayed on the display unit 251. Furthermore, along with the page of the electronic note, thumbnail images corresponding to the previous and next pages, respectively, may be displayed on the display unit 251.

At this time, when a touch input on the thumbnail image 262 is sensed, the controller 180 may edit the thumbnail image 262 using the page. Furthermore, the controller 180 may also edit the next page according to the editing of the thumbnail image 262.

Specifically, as illustrated in FIG. 6A, when a drag input is received in the direction of the thumbnail image 262 subsequent to selecting a partial region 264 of the page containing an image, the controller 180 may copy the selected region 264 containing an image to the thumbnail image 262.

At this time, the controller 180 may display a thumbnail image 265 (hereinafter, referred to as a "first thumbnail image") corresponding to the selected region 264 containing an image on the display unit 251 from the start of the drag input to the end thereof. At this time, as the location of a touch position according to the drag input is changed, the location of the first thumbnail image 265 may be moved.

Furthermore, while receiving a drag input, the controller 180 may change at least one of the size and transparency of the first thumbnail image 265. For example, as the location of the first thumbnail image 265 is moved in the direction of the thumbnail image 262 corresponding to the next page, the first thumbnail image 265 may gradually become transparent, and the size thereof may be reduced.

Then, at the end of the drag input, the controller 180 may copy the selected region 264 to the thumbnail image 262, and allow the first thumbnail image 265 to be disappeared from the display unit 251.

On the other hand, when the selected region 264 is copied to the thumbnail image 262, the controller 180 may change the size of the thumbnail image 262 for a predetermined period of time. As illustrated in the drawing, the controller 180 may instantaneously enlarge the size of the thumbnail image 262. Then, though not shown in the drawing, the controller 180 may also display an object indicating that the selected region 264 is copied to the thumbnail image 262 on the thumbnail image 262.

Furthermore, when the selected region 264 is copied to the thumbnail image 262, the controller 180 may dispose the selected region 264 at a specific location of the thumbnail image 262, for example, a portion where the object is not displayed. On the other hand, though not shown in the drawing, the controller 180 may detect a coordinate at which the selected region 264 is disposed in the page, and dispose the selected region 264 at a location corresponding to the coordinate detected from the thumbnail image 262.

On the other hand, though not shown in the drawing, when the selected region 264 is copied to the thumbnail image 262, the size of the selected region 264 may be automatically changed and copied to the thumbnail image 262, or a popup window capable of changing the size of the selected region 264 may be displayed on the display unit 251.

On the other hand, as illustrated in FIG. 6B, when a drag input is received in the direction of the thumbnail image 262 subsequent to selecting a partial region 264 of the page containing a text, the controller 180 may copy the selected region 264 containing a text to the thumbnail image 262. The selected region 264 containing a text may be also disposed at a specific location of the thumbnail image 262 similarly to the foregoing method.

Furthermore, though not shown in the drawing, the controller 180 may also copy the entire region of a page to the thumbnail image 262.

On the other hand, as the selected region 264 is copied to the thumbnail image 262, the controller 180 may also copy the selected region 264 to the next page. Specifically, as illustrated in FIG. 7, when a touch input on the thumbnail image 262 in which the selected region 264 has been copied is sensed, the controller 180 may display the next page in which the selected region 264 has been copied on the display unit 251. At this time, thumbnail images corresponding to the previous and next pages, respectively, of the next page may be displayed together on the display unit 251.

Figure 8:
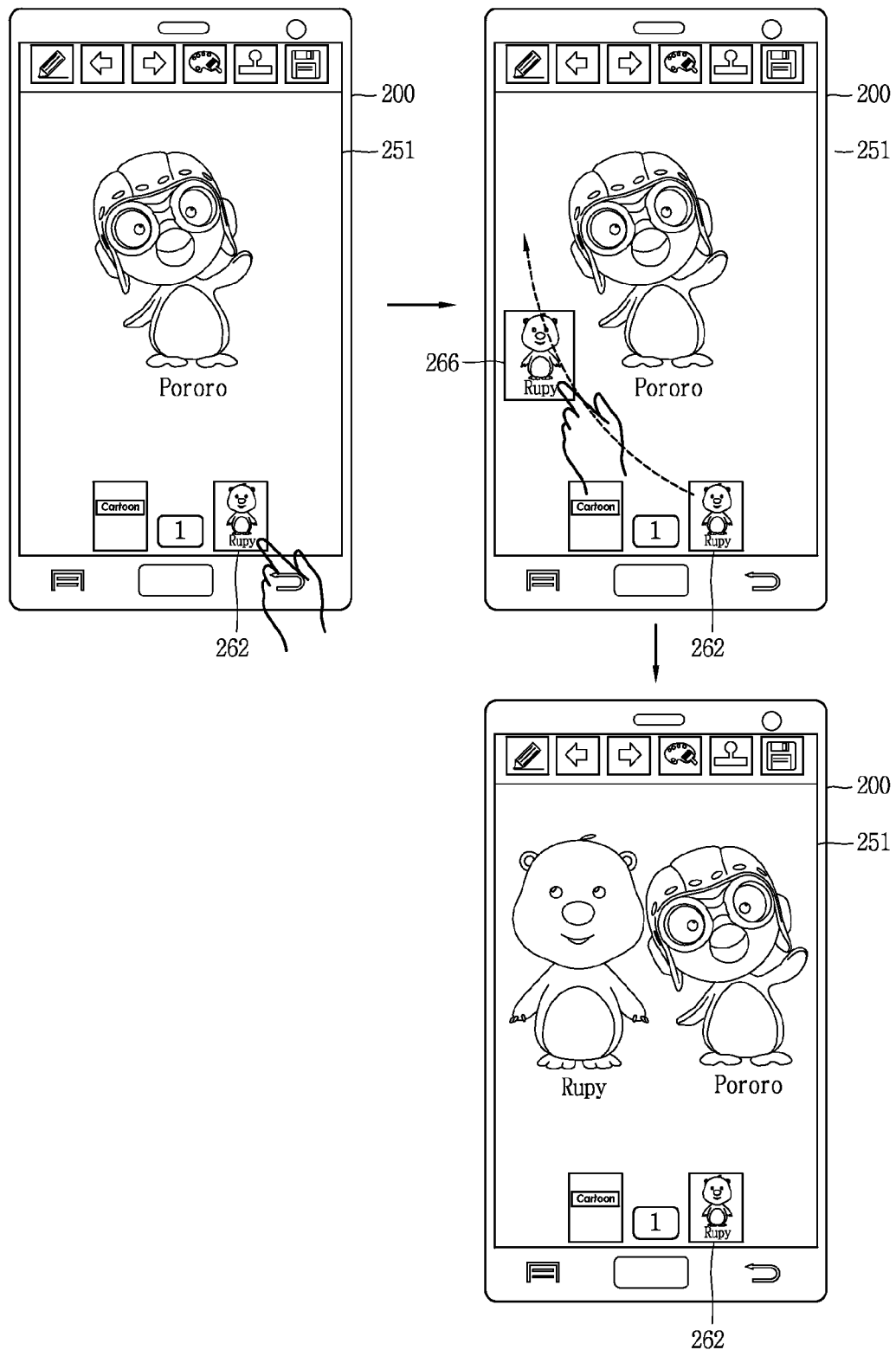

FIG. 8 is a conceptual view illustrating an operation example of the mobile terminal 200 according to FIG. 3. The mobile terminal 200 may include a display unit 251, a sensing unit 140 (refer to FIG. 1), and a controller 180 (refer to FIG. 1).

Referring to FIG. 8, a page of the electronic note may be displayed on the display unit 251. Furthermore, along with the page of the electronic note, thumbnail images corresponding to the previous and next pages, respectively, may be displayed on the display unit 251.

At this time, when a drag input is received in the direction of the page subsequent to selecting thumbnail image 262, the controller 180 may copy the thumbnail image 262 to the page. Though not shown in the drawing, the controller 180 may also copy a partial region of the thumbnail image 262 to the page.

At this time, the controller 180 may display another thumbnail image 266 (hereinafter, referred to as a "second thumbnail image") corresponding to the thumbnail image 262 from the start of the drag input to the end thereof. At this time, as the location of a touch position according to the drag input is changed, the location of the second thumbnail image 266 may be moved.

Furthermore, while receiving a drag input, the controller 180 may change at least one of the size and transparency of the second thumbnail image 266. For example, as the location of the second thumbnail image 266 is moved in the direction of the page, the second thumbnail image 266 may gradually become transparent, and the size thereof may be enlarged.

Then, at the end of the drag input, the controller 180 may copy the thumbnail image 262 to the page, and allow the second thumbnail image 266 to be disappeared from the display unit 251. Though not shown in the drawing, the controller 180 may also display an object indicating that the thumbnail image 262 is copied to the page on the page.

Furthermore, when the thumbnail image 262 is copied to the page, the controller 180 may dispose the thumbnail image 262 at a location where a touch input is sensed on the page. At this time, the controller 180 may move the location of an object displayed on the page while disposing the thumbnail image 262 at the location where the touch input is sensed. Though not shown in the drawing, the controller 180 may dispose the thumbnail image 262 at a portion where the object is not displayed on the page. Furthermore, the controller 180 may overlap the thumbnail image 262 and the page.

Figure 9:
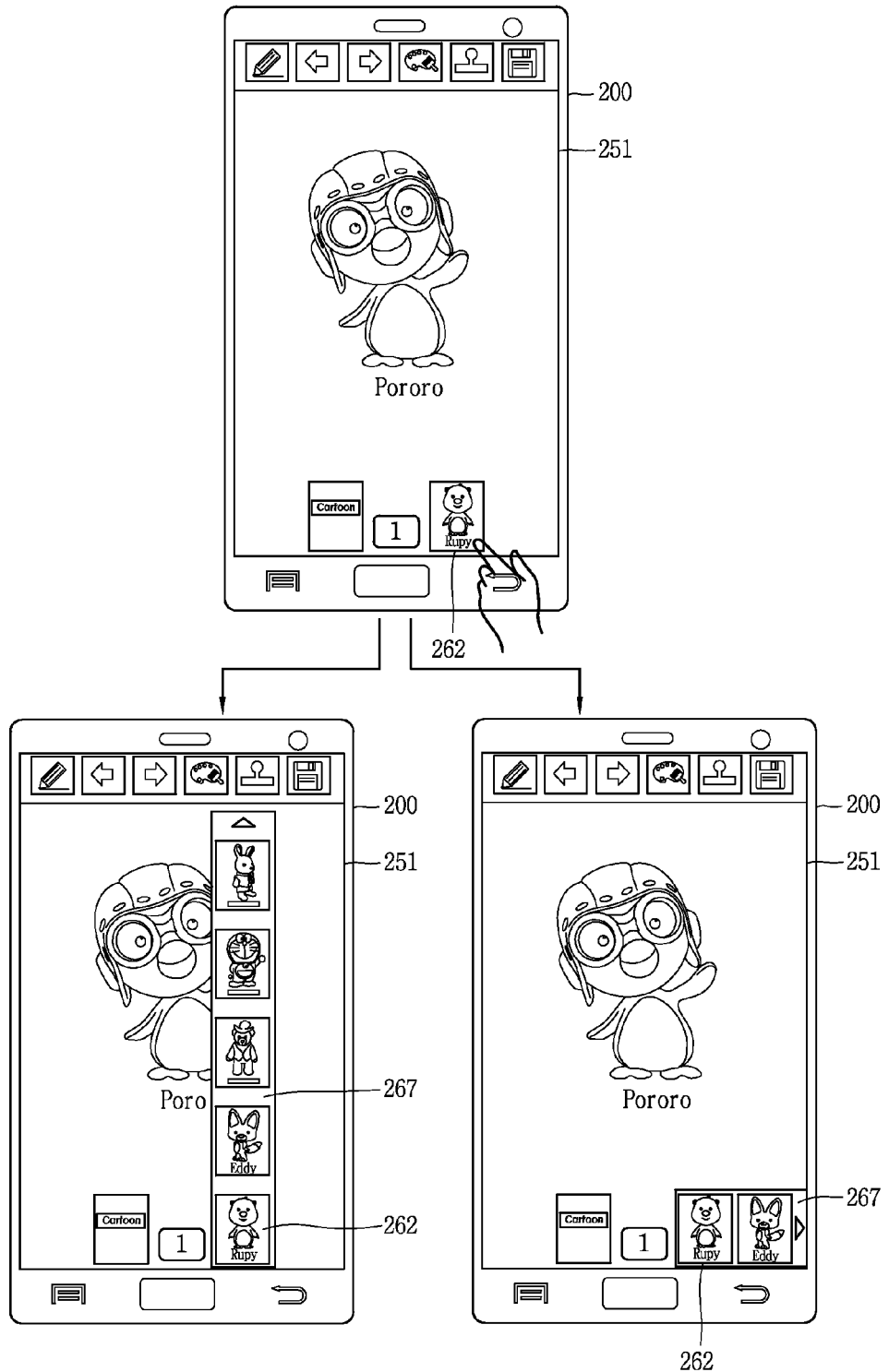
Figure 10:
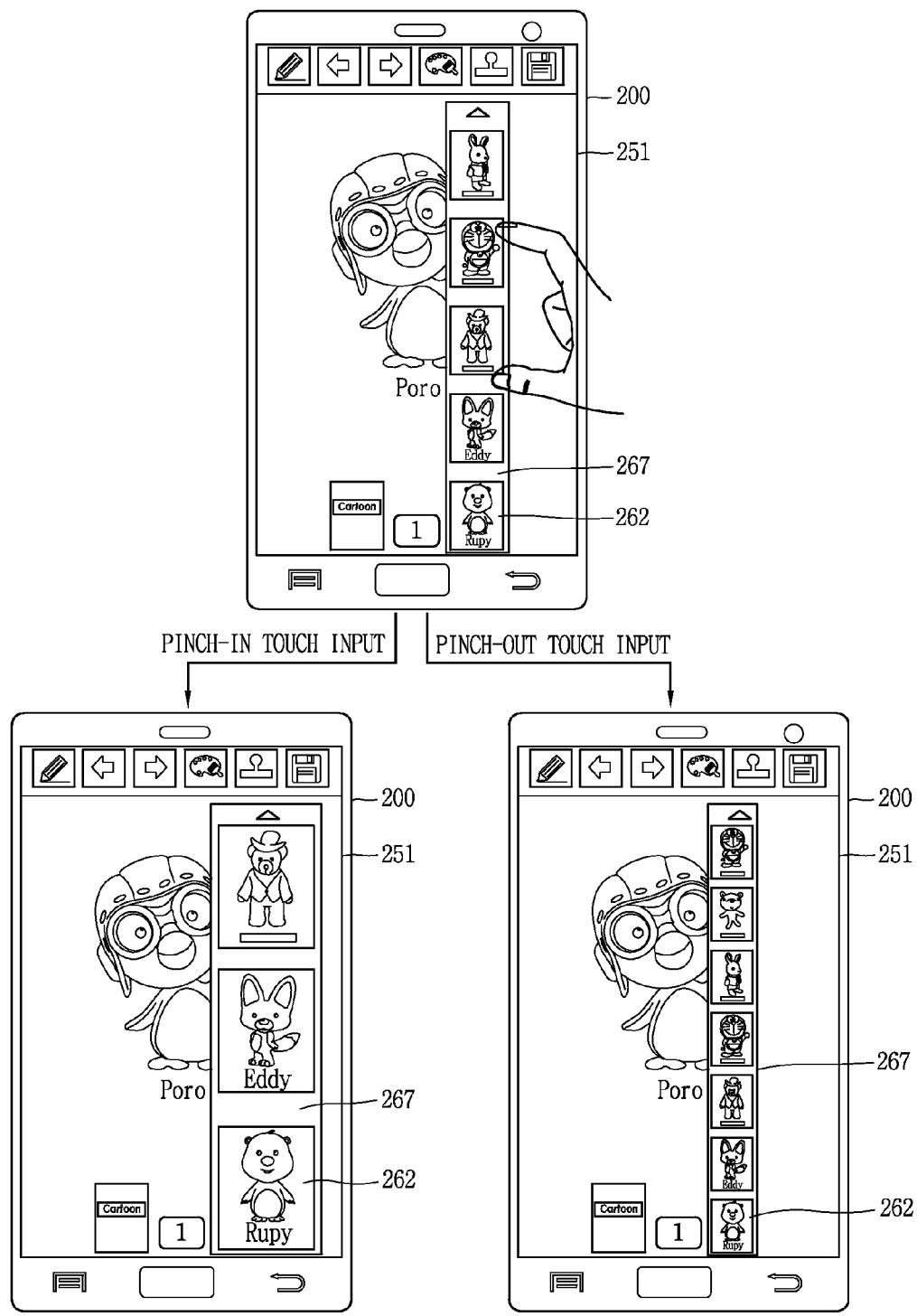

FIGS. 9 and 10 are conceptual views illustrating an operation example of the mobile terminal 200 according to FIG. 3. The mobile terminal 200 may include a display unit 251, a sensing unit 140 (refer to FIG. 1), and a controller 180 (refer to FIG. 1).

Referring to FIG. 9, a page of the electronic note may be displayed on the display unit 251. Furthermore, along with the page of the electronic note, thumbnail images corresponding to the previous and next pages, respectively, may be displayed on the display unit 251.

At this time, when a touch input on the thumbnail image 262 corresponding to the next page is sensed, the controller 180 may display a plurality of thumbnail images 267 corresponding to a plurality of next pages, respectively, on the display unit 251.

As illustrated in the drawing, the plurality of thumbnail images 267 may be arranged in the longitudinal and transverse directions. However, the arrangement shape of the plurality of thumbnail images 267 will not be limited to this. For example, the plurality of thumbnail images 267 may be arranged in a fan shape or arranged in a checker board shape.

Referring to FIG. 10, when a touch input on the plurality of thumbnail images 267 is sensed, for example, when a multi-touch input is sensed, the controller 180 may change the size of the plurality of thumbnail images 267. Furthermore, the controller 180 may change the number of the plurality of thumbnail images 267 displayed on one screen.

For example, when a first and a second touch position of the touch input on the plurality of thumbnail images 267 are sensed to move in the directions of being far away from each other, namely, when a pinch-in touch input is sensed, the controller 180 may decrease the number of the plurality of thumbnail images 267 displayed on one screen while enlarging the size of the plurality of thumbnail images 267.

On the contrary, when a first and a second touch position of the touch input on the plurality of thumbnail images 267 are sensed to move in the directions of drawing closer to each other, namely, when a pinch-out touch input is sensed, the controller 180 may increase the number of the plurality of thumbnail images 267 displayed on one screen while reducing the size of the plurality of thumbnail images 267.

On the other hand, though not shown in the drawing, when a touch input on the plurality of thumbnail images 267 is sensed, for example, when a flick input is sensed, the controller 180 may perform scrolling for the plurality of thumbnail images 267. Accordingly, a plurality of other thumbnail images may be displayed on the display unit 251.

Furthermore, though not shown in the drawing, the controller 180 may execute an edit mode for editing at least part of the plurality of thumbnail images 267 based on a touch input on the plurality of thumbnail images 267. For example, the controller 180 may overlap at least part of the plurality of thumbnail images 267, change an arrangement order of at least part thereof, or remove at least part thereof.

Figure 11:
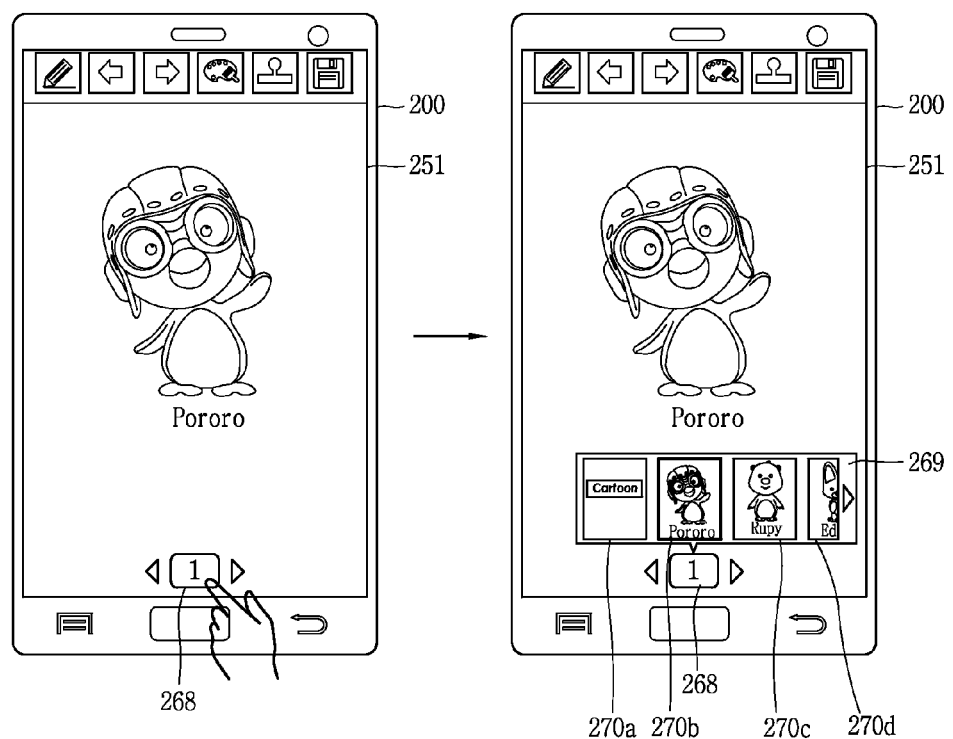

FIG. 11 is a conceptual view illustrating an operation example of the mobile terminal 200 according to FIG. 3. The mobile terminal 200 may include a display unit 251, a sensing unit 140 (refer to FIG. 1), and a controller 180 (refer to FIG. 1).

Referring to FIG. 11, a page of the electronic note may be displayed on the display unit 251. Furthermore, along with the page of the electronic note, an icon 268 indicating the page number may be displayed on the display unit 251.

At this time, when a touch input on the icon 268 is sensed, the controller 180 may display a plurality of thumbnail images 269 corresponding to a plurality of pages, respectively, on the display unit 251.

As illustrated in the drawing, the plurality of thumbnail images 269 may be arranged in the transverse direction. However, the arrangement shape of the plurality of thumbnail images 269 will not be limited to this. For example, the plurality of thumbnail images 269 may be arranged in the longitudinal direction, arranged in a fan shape or arranged in a checker board shape.

Furthermore, three thumbnail images may be all displayed, and part of one thumbnail image may be displayed on one screen. However, the number of thumbnail images displayed on one screen will not be limited to this. The controller 180 may provide a highlighting effect on a thumbnail image 270b corresponding to a currently display page among the plurality of thumbnail images 269.

On the other hand, though not shown in the drawing, when a touch input on the plurality of thumbnail images 269 is sensed, for example, when a flick input is sensed, the controller 180 may perform scrolling for the plurality of thumbnail images 269. Accordingly, a plurality of other thumbnail images may be displayed on the display unit 251.

Furthermore, when a touch input on the plurality of thumbnail images 269 is sensed, for example, when a multi-touch input is sensed, the controller 180 may change the size of the plurality of thumbnail images 269. Similarly, the controller 180 may also change the number of the plurality of thumbnail images 269 displayed on one screen.

Furthermore, though not shown in the drawing, at least one of a thumbnail image corresponding to a back cover of the electronic note, a thumbnail image corresponding to a front cover of another electronic note and a thumbnail image corresponding to the electronic bookshelf may be displayed at the right side of the thumbnail image corresponding to the last page of the electronic note.

Figure 12:
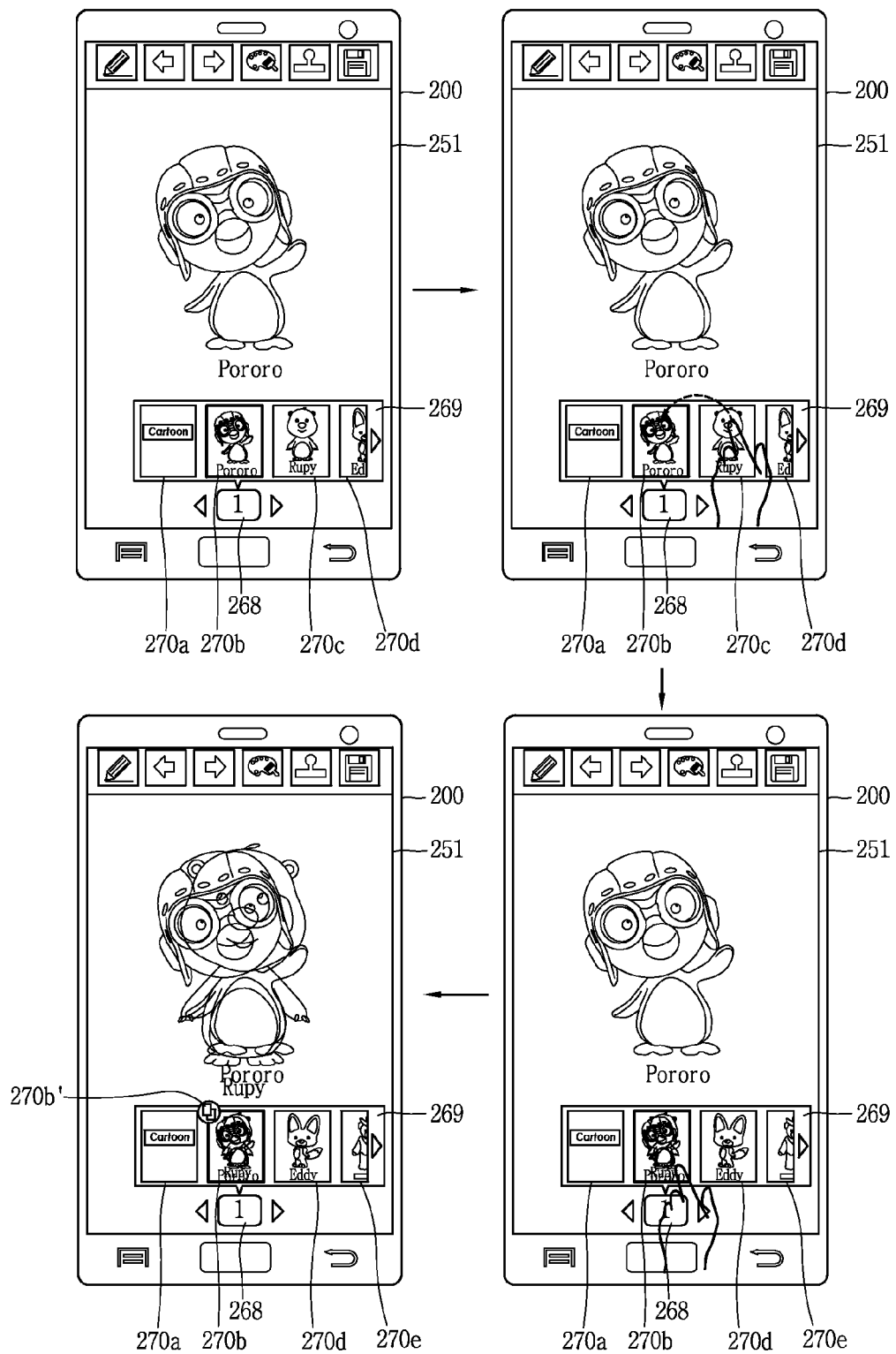
Figure 13:
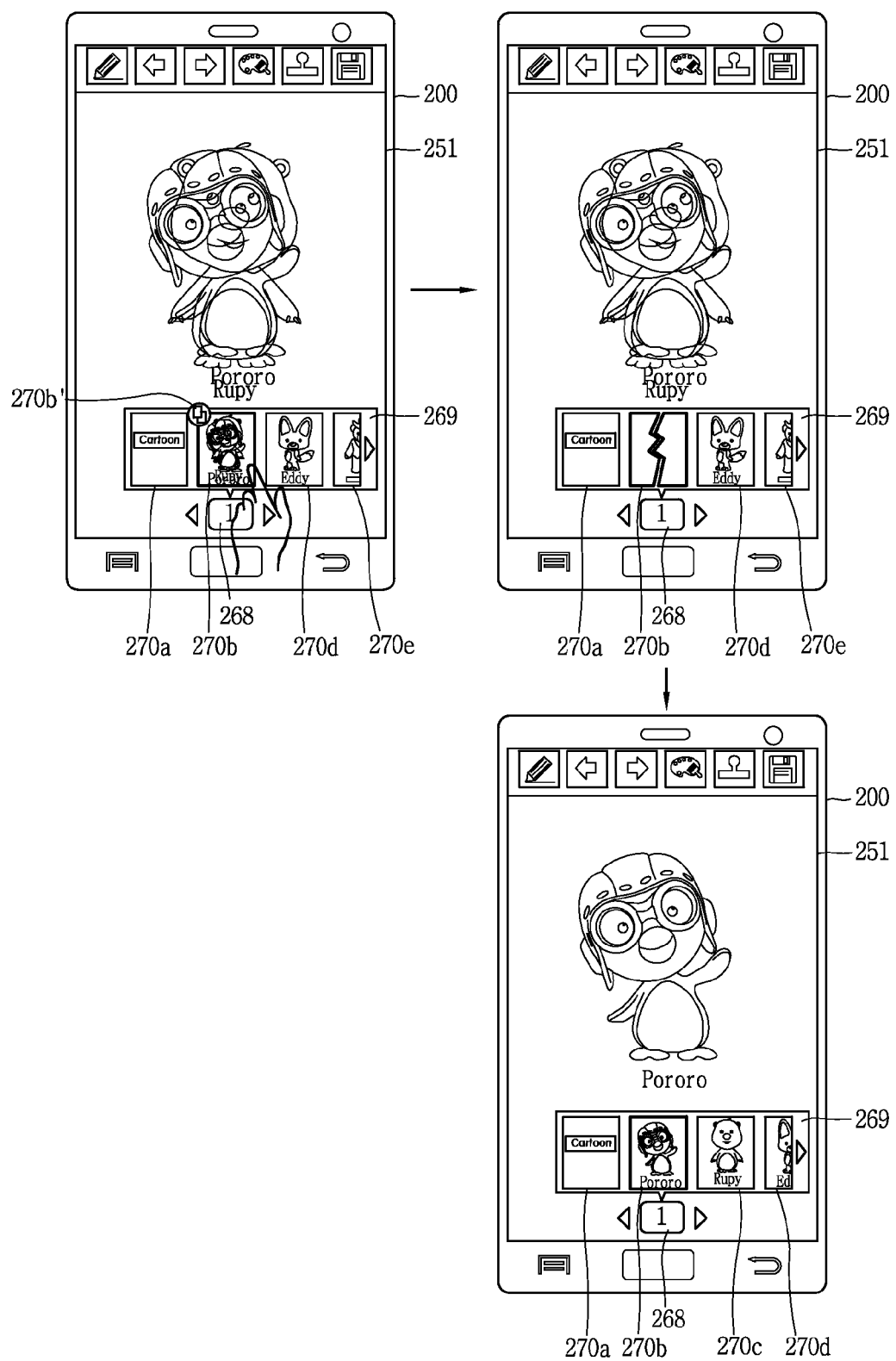

FIGS. 12 and 13 are conceptual views illustrating an operation example of the mobile terminal 200 according to FIG. 3. The mobile terminal 200 may include a display unit 251, a sensing unit 140 (refer to FIG. 1), and a controller 180 (refer to FIG. 1).

Referring to FIG. 12, a page of the electronic note may be displayed on the display unit 251. Furthermore, along with the page of the electronic note, an icon 268 indicating the page number and a plurality of thumbnail image 269 corresponding to a plurality of pages, respectively, may be displayed on the display unit 251.

The controller 180 may execute an edit mode for editing at least part of the plurality of thumbnail images 269 based on a touch input on the plurality of thumbnail images 269. The controller 180 may edit a page corresponding to at least part of the plurality of thumbnail images 269 according to the editing of at least part of the plurality of thumbnail images 269.

For example, the controller 180 may overlap the selected thumbnail images based on a touch input on at least two of the plurality of thumbnail images 269. At this time, as the selected thumbnail images are overlapped with one another, the controller 180 may also overlap pages corresponding to the selected thumbnail images.

Specifically, as illustrated in the drawing, when any one (hereinafter, referred to as a "second thumbnail image 270c") of the plurality of thumbnail images 269 is selected and then a drag input is received in the direction of another one (hereinafter, referred to as a "first thumbnail image 270b") thereof, the controller 180 may overlap the second thumbnail image 270c with the first thumbnail image 270b. Though not shown in the drawing, the controller 180 may also overlap a partial region of the second thumbnail image 270c with the first thumbnail image 270b.

At this time, the first thumbnail image 270b may cover the second thumbnail image 270c, and otherwise the second thumbnail image 270c may cover the first thumbnail image 270b based on the priority information of the first and the second thumbnail image 270b, 270c, respectively.

Furthermore, though not shown in the drawing, when the second thumbnail image 270c is overlapped with the first thumbnail image 270b, the controller 180 may change at least one of the size and transparency of the first thumbnail image 270b for a predetermined period of time, thereby showing that the first and the second thumbnail image 270b, 270c can be overlapped with each other. For example, the controller 180 may instantaneously display the first thumbnail image 270b in a semi-transparent manner.

Then, the controller 180 may allow the second thumbnail image 270c to be disappeared from the display unit 251. Furthermore, the controller 180 may display an object 270b' indicating that the first and the second thumbnail image 270b, 270c are overlapped with the first thumbnail image 270b.

On the other hand, as the first and the second thumbnail image 270b, 270c are overlapped with each other, pages corresponding to the first and the second thumbnail image 270b, 270c, respectively, may be overlapped with each other. Accordingly, objects contained in a page corresponding to the second thumbnail image 270c may be overlapped with a page corresponding to the first thumbnail image 270b, and a page corresponding to the second thumbnail image 270c may be removed.

Then, referring to FIG. 13, when a touch input on the first thumbnail image 270b is sensed, the controller 180 may restore the overlapped first and the second thumbnail image 270b, 270c. At this time, as illustrated in the drawing, the controller 180 may provide an animation effect, for example, an effect of being torn apart in both directions, to the first thumbnail image 270b. Then, the controller 180 may display the second thumbnail image 270c on the display unit 251.

On the other hand, as the first and the second thumbnail image 270b, 270c are restored, the controller 180 may restore pages corresponding to the first and the second thumbnail image 270b, 270c, respectively. Accordingly, objects contained in a page corresponding to the second thumbnail image 270c may be disappeared from a page corresponding to the first thumbnail image 270b, and a page corresponding to the second thumbnail image 270c may be generated again. On the other hand, when objects contained in a page corresponding to the second thumbnail image 270c are disappeared, the controller 180 may provide a fade-out effect thereon.

Figure 14:
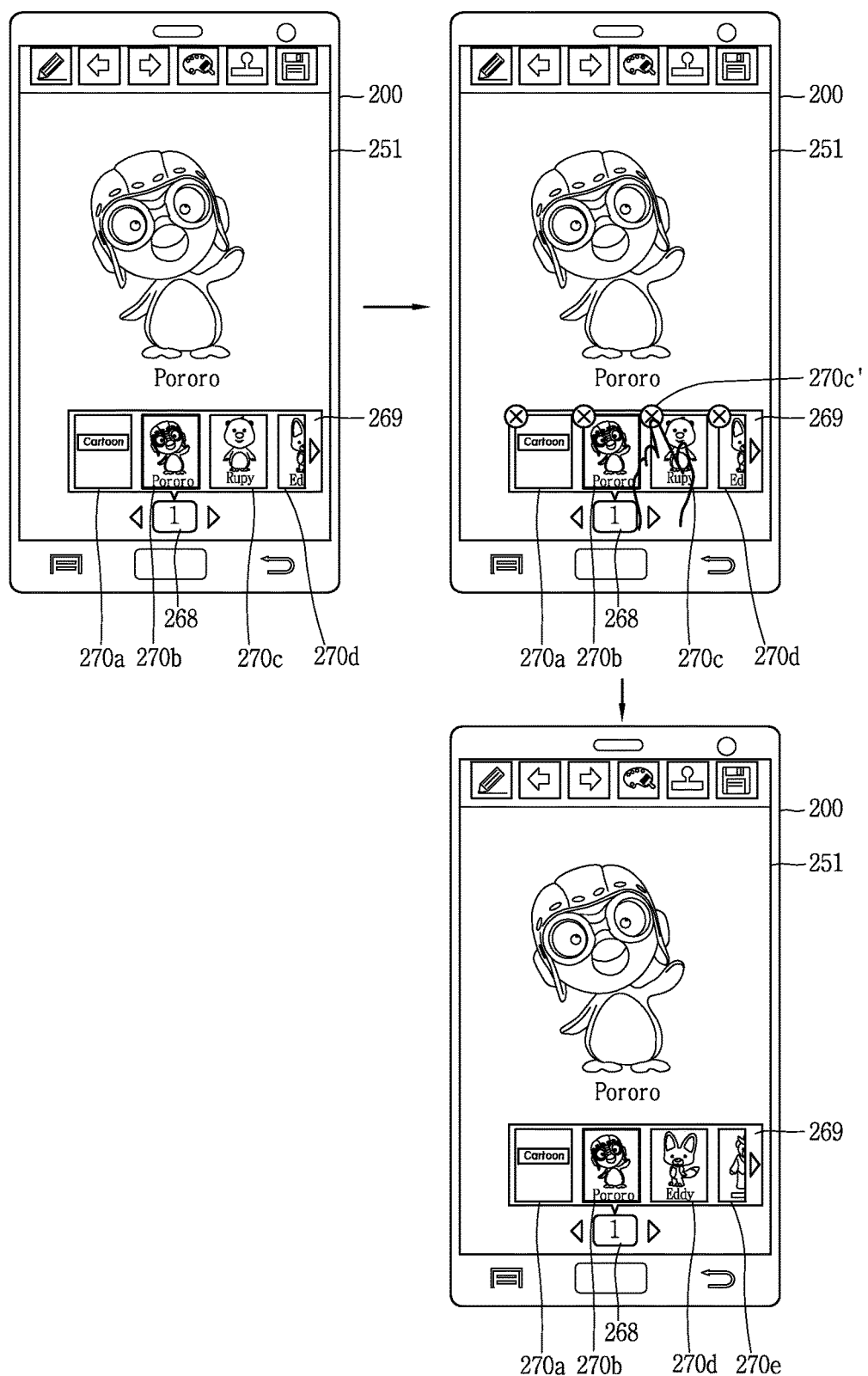
Figure 15:
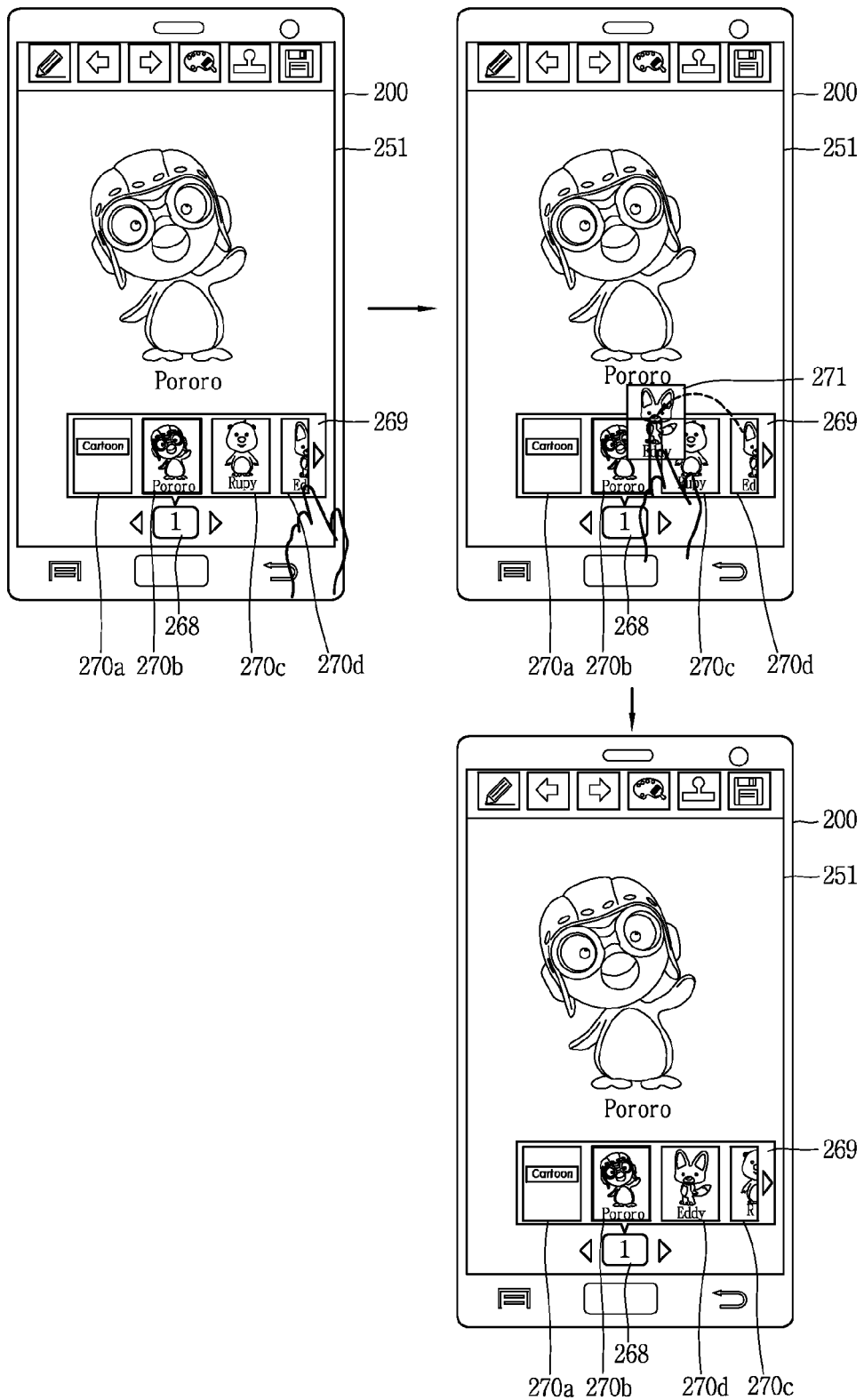
Figure 16:
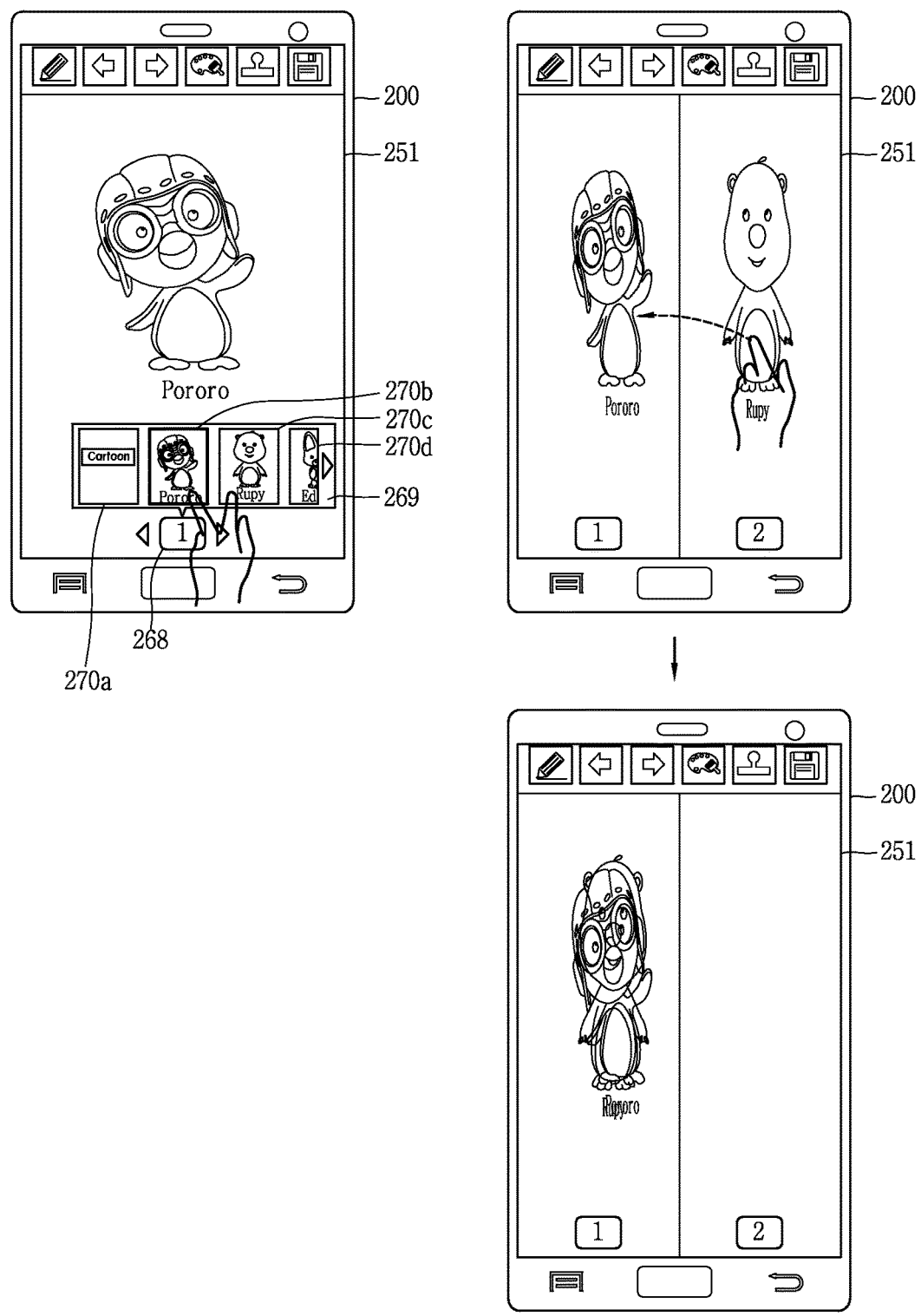

FIGS. 14 through 16 are conceptual views illustrating an operation example of the mobile terminal 200 according to FIG. 3. The mobile terminal 200 may include a display unit 251, a sensing unit 140 (refer to FIG. 1), and a controller 180 (refer to FIG. 1).

Referring to FIGS. 14 through 16, a page of the electronic note may be displayed on the display unit 251. Furthermore, along with the page of the electronic note, an icon 268 indicating the page number and a plurality of thumbnail image 269 corresponding to a plurality of pages, respectively, may be displayed on the display unit 251.

As illustrated in FIG. 14, the controller 180 may remove the selected thumbnail image based on a touch input on at least one of the plurality of thumbnail images 269. At this time, as the selected thumbnail image is removed, the controller 180 may also remove a page corresponding to the selected thumbnail image.

Specifically, when a touch input on at least one (hereinafter, referred to as a "first thumbnail image 270c") of the plurality of thumbnail images 269 is sensed, the controller 180 may display an object 270c' corresponding to the function of removing the first thumbnail image 270c on the display unit 251. Then, when a touch input on the object 270c' is sensed, the controller 180 may remove the first thumbnail image 270c.

Furthermore, as illustrated in FIG. 15, the controller 180 may change an arrangement of the plurality of thumbnail images 269 based on a touch input on at least one of the plurality of thumbnail images 269. At this time, as the arrangement of the plurality of thumbnail images 269 is changed, the controller 180 may change the order of pages corresponding to the plurality of thumbnail images 269, respectively.

Specifically, when any one (hereinafter, referred to as a "first thumbnail image 270d") of a plurality of thumbnail images 269 is selected and then a drag input is received in the direction of a space between other thumbnail images 279b, 270c, the controller 180 may display another thumbnail image (hereinafter, referred to as a "second thumbnail image 271") corresponding to the first thumbnail image 270d on the display unit 251.

On the other hand, the controller 180 may change at least one of the size and transparency of the second thumbnail image 271 while receiving a drag input. For example, as the location of the second thumbnail image 271 is moved in the direction of a space between the other thumbnail images 270b, 270c, the controller 180 may display the second thumbnail image 271 in a semi-transparent manner.

Then, at the end of the drag input, the controller 180 may dispose the first thumbnail image 270d between the other thumbnail images 270b, 270c, and allow the second thumbnail image 271 to be disappeared from the display unit 251. At this time, the controller 180 may provide an effect of allowing the first thumbnail image 270d to be emerged from the bottom to the top or dropped from the top to the bottom between the other thumbnail images 270b, 270c based on the direction of a touch input.

On the other hand, as illustrated in FIG. 16, the controller 180 may display a page corresponding to the selected thumbnail image on the display unit 251 based on a touch input on at least one of a plurality of thumbnail images 269.

Specifically, when a touch input on at least one (hereinafter, referred to as "first and second images 270b, 270c") of the plurality of thumbnail images 269 is sensed, the controller 180 may configure a first and a second screen region, and display pages (hereinafter, referred to as "first and second pages") corresponding to the first and the second thumbnail image 270b, 270c, respectively, in the first and the second screen region, respectively.

At this time, as illustrated in the drawing, when a drag input is received in the direction of the first page subsequent to selecting the second page, the controller 180 may overlap the first and the second page with each other.

Figure 17:
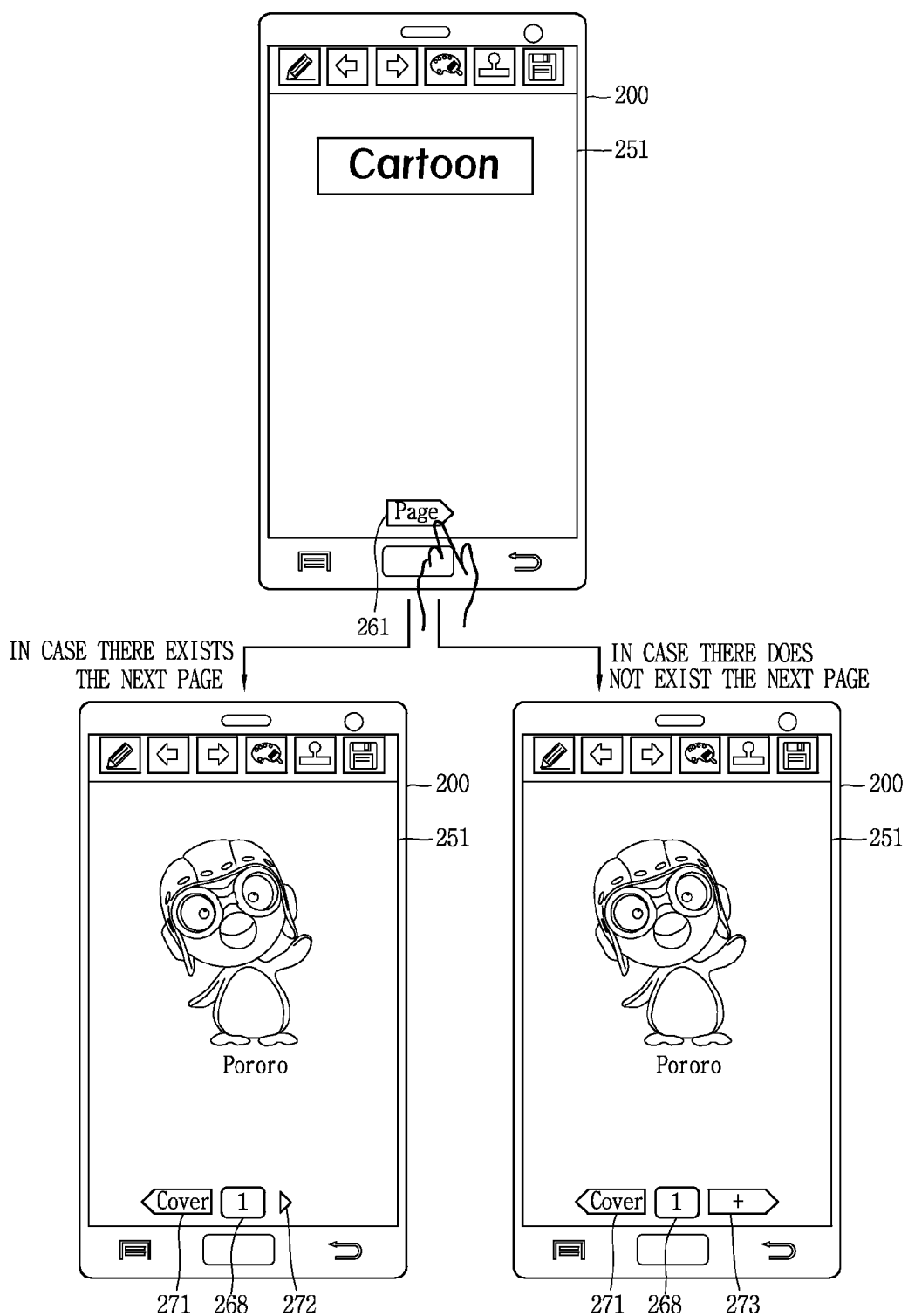

FIG. 17 is a conceptual view illustrating an operation example of the mobile terminal 200 according to FIG. 3. The mobile terminal 200 may include a display unit 251, a sensing unit 140 (refer to FIG. 1), and a controller 180 (refer to FIG. 1).

Referring to FIG. 17, a front cover of the electronic note may be displayed on the display unit 251. Furthermore, the front cover of the electronic note may include an icon 261 corresponding to the function of displaying a page of the electronic note. When a touch input on the icon 261 is sensed, the controller 180 may display a page of the electronic note on the display unit 251.

At this time, when there exists the next page of a currently display page, the controller 180 may display an icon 271 corresponding to the function of displaying a front cover of the electronic note and an icon 272 corresponding to the function of displaying the next page thereof on the display unit 251.

On the contrary, when there does not exist the next page of a currently display page, the controller 180 may display an icon 271 corresponding to the function of displaying a front cover of the electronic note and an icon 273 corresponding to the function of generating a new page on the display unit 251. Then, the controller 180 may generate the previous or next page of a currently display page based on a touch input on the icon 273.

On the other hand, though not shown in the drawing, when the currently display page is the first page, the controller 180 may display a thumbnail image corresponding to a front cover of the electronic note or a thumbnail image corresponding to an electronic bookshelf containing the electronic note along with the page.

Furthermore, when the currently display page is the last page, the controller 180 may display a thumbnail image corresponding to a back cover of the electronic note, a thumbnail image corresponding to a front cover of another electronic note or a thumbnail image corresponding to the electronic bookshelf along with the page.

Figure 18:
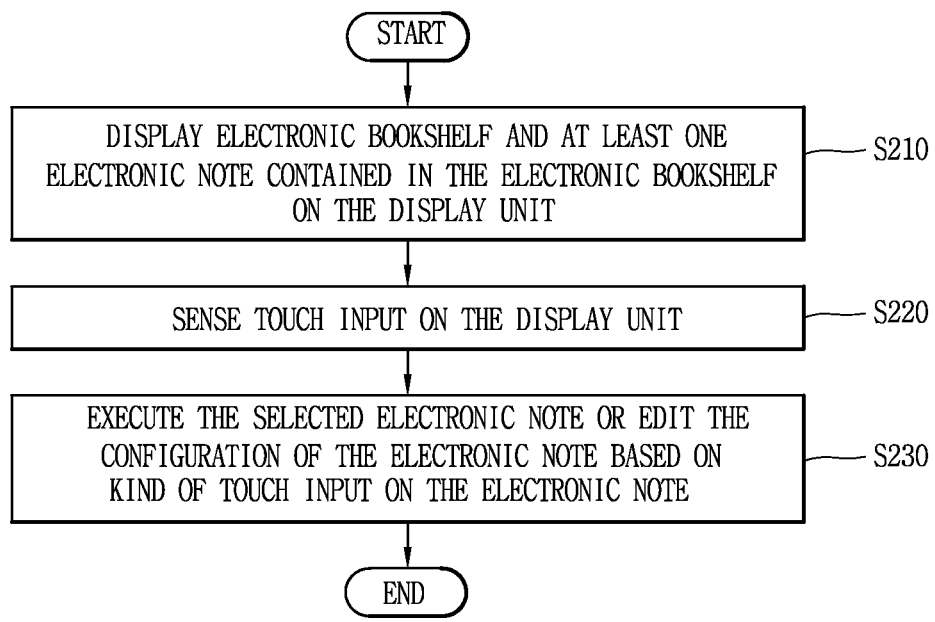
FIG. 18 is a flow chart for explaining a mobile terminal according to another embodiment of the present disclosure.

FIG. 18 is a flow chart for explaining a mobile terminal according to another embodiment of the present disclosure. The mobile terminal 100 may include a display unit 151, a sensing unit 140 (refer to FIG. 1), and a controller 180 (refer to FIG. 1).

Referring to FIG. 18, first, the process of displaying an electronic bookshelf and at least one electronic note contained in the electronic bookshelf on the display unit 151 (S210) is carried out.

Next, the process of sensing a touch input on the display unit 151 (S220) is carried out. At this time, the sensing unit 140 may sense a touch input on a predetermined region of the display unit 151 or sense a touch input on the entire region of the display unit 151.

Specifically, the sensing unit 140 may sense a touch input on the display unit 151. At this time, the sensing unit 140 may sense a touch input on a predetermined region of the display unit 151 or sense a touch input on the entire region of the display unit 151.

Then, the process of executing the selected electronic note or editing the configuration of the electronic bookshelf based on a kind of touch input on the electronic note (S230) is carried out.

Specifically, when a touch input on the electronic note is sensed, the controller 180 may determine a kind of touch input on the electronic note.

For example, when a first touch input on the electronic note is sensed, the controller 180 may execute the electronic note. At this time, the controller 180 may disappear the electronic bookshelf and then display a page of the electronic note on the display unit 151, or display the electronic bookshelf along with a page of the electronic note on the display unit 151.

More specifically, the controller 180 may configure a first and a second screen region based on a touch input on the electronic note, and display an electronic bookshelf and a page of the electronic note in the first and the second screen region, respectively. Furthermore, the controller 180 may generate a popup window in a state that the electronic bookshelf is displayed, and display a page of the electronic note on the popup window.

On the other hand, when a second touch input on the electronic note is sensed, the controller 180 may edit the configuration of an electronic bookshelf. In other words, the controller 180 may edit at least one of the electronic bookshelf and electronic note. For example, the controller 180 may merge at least part of electronic notes contained in the electronic bookshelf, change an arrangement order of at least part thereof, or remove at least part thereof. Furthermore, the controller 180 may change at least one of the size and transparency of electronic notes.

To this end, when a second touch input on the electronic note is sensed, the controller 180 may display a popup window containing icons corresponding to the function of sharing an electronic note, the function of removing an electronic note, and the function of displaying an electronic note on the home screen, respectively, on the display unit 151.

As described above, according to the present disclosure, an electronic bookshelf and electronic notes contained in the electronic bookshelf may be displayed on the display unit 151 of the mobile terminal 100. Accordingly, the user may edit the configuration of an electronic bookshelf, and edit the configuration of an electronic note on one screen. In other words, the user may feel amusement through the editing of the electronic bookshelf and electronic note. As a result, it may be possible to enhance the user's convenience.

Figure 19:
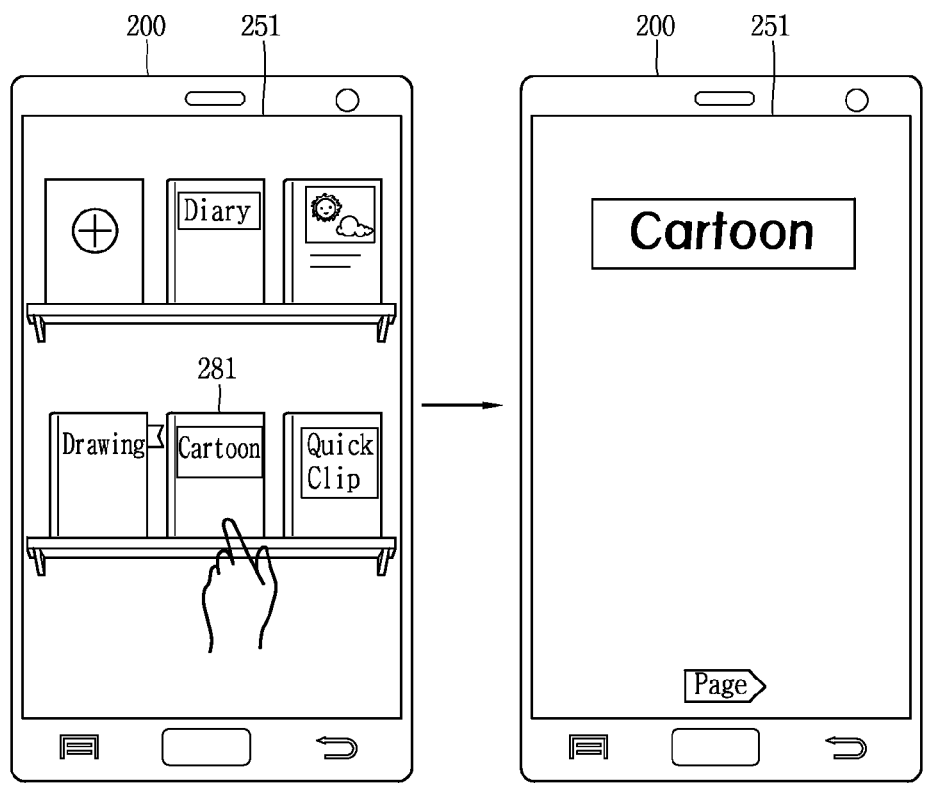
FIGS. 19, 20, 21, 22, 23, 24, 25, 26, 27, 28, 29, 30 and 31 are conceptual views illustrating an operation example of the mobile terminal according to FIG. 18.

FIG. 19 is a conceptual view illustrating an operation example of the mobile terminal 200 according to FIG. 18. The mobile terminal 200 may include a display unit 251, a sensing unit 140 (refer to FIG. 1), and a controller 180 (refer to FIG. 1).

Referring to FIG. 19, an electronic bookshelf and electronic notes contained in the electronic bookshelf may be displayed on the display unit 251.

At this time, when a cover of the electronic note is specified, the controller 180 may display the cover of the electronic note on the display unit 251. On the contrary, when a cover of the electronic note is not specified, the controller 180 may display a thumbnail image corresponding to a page of the electronic note on the display unit 251.

On the other hand, the controller 180 may display information associated with the electronic note as a cover of the electronic note. Here, the information associated with the electronic note may include a title of the electronic note, a date on which the electronic note is generated, a total number of pages of the electronic note, a use history of the electronic note, and the like. Furthermore, the controller 180 may display a thumbnail image corresponding to the most recently displayed page or a list of bookmarks contained in the electronic note as a cover of the electronic note.

On the other hand, the controller 180 may control the graphic information of the cover of the electronic note based on a use frequency of the electronic notes. For example, the controller 180 may provide a faded effect, a wrinkled effect, a stained effect or the like to the cover of the electronic note.

Though not shown in the drawing, the controller 180 may display electronic notes in different shapes based on a total number of pages of electronic notes. For example, the controller 180 may display electronic notes on the display unit 251 to have different depth values from one another in a three-dimensional stereoscopic image. The controller 180 may display the electronic note in a shape that a sheet of paper is unfolded, a shape that several sheets of paper are folded, a thin note shape, or a thick note shape on the display unit 251.

On the other hand, when the movement of the terminal body is sensed, the controller 180 may display another surface, for example, a lateral surface, of the electronic notes on the display unit 251, thereby allowing the user to estimate a total number of pages of the electronic notes.

Then, when a touch input on at least one 281 of electronic notes contained in the electronic bookshelf is sensed, the controller 180 may execute the selected electronic note 281. As illustrated in the drawing, the controller 180 may disappear the electronic bookshelf and then display a front cover of the electronic note 281 on the display unit 251. Though not shown in the drawing, when a touch input on the electronic note that is not specified with a front cover is sensed, the controller 180 may display a page of the electronic note on the display unit 251.

Furthermore, though not shown in the drawing, when a touch input on a bookmark is sensed in case that the electronic note contains the bookmark, the controller 180 may display a page corresponding to the bookmark on the display unit 251 while executing the selected electronic note.

Then, when a touch input on an icon corresponding to the function of turning a page is sensed, the controller 180 may disappear a front cover of the first electronic note 281 and then display the first page of thereof on the display unit 251.

On the other hand, though not shown in the drawing, when the front cover is disappeared and the first page is displayed, the controller 180 may provide an animation effect, for example, turning a cover thereof. Furthermore, when a currently display page is disappeared and the next page is displayed, the controller 180 may provide another animation effect, for example, turning a page.

Figure 20:
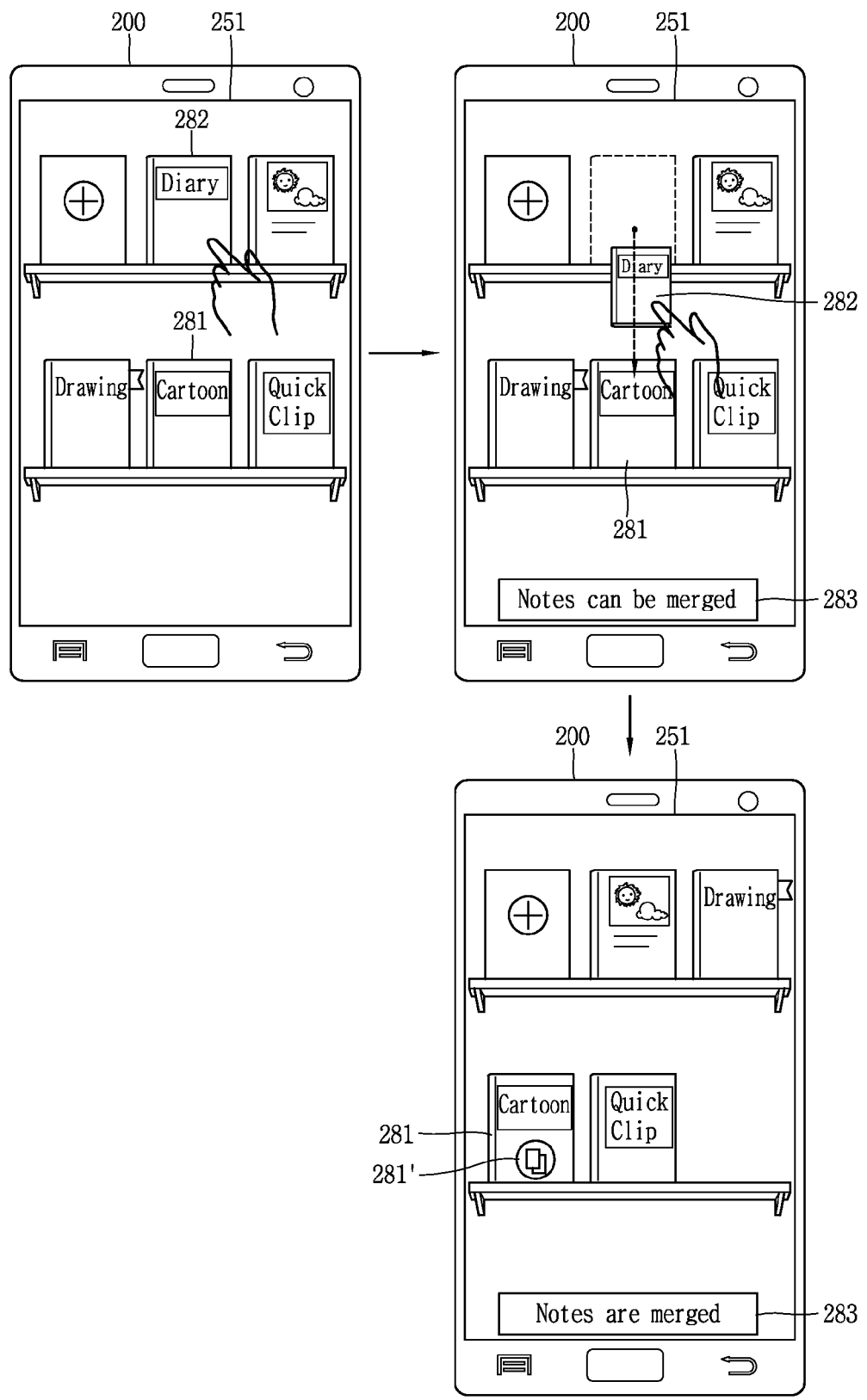
Figure 21:
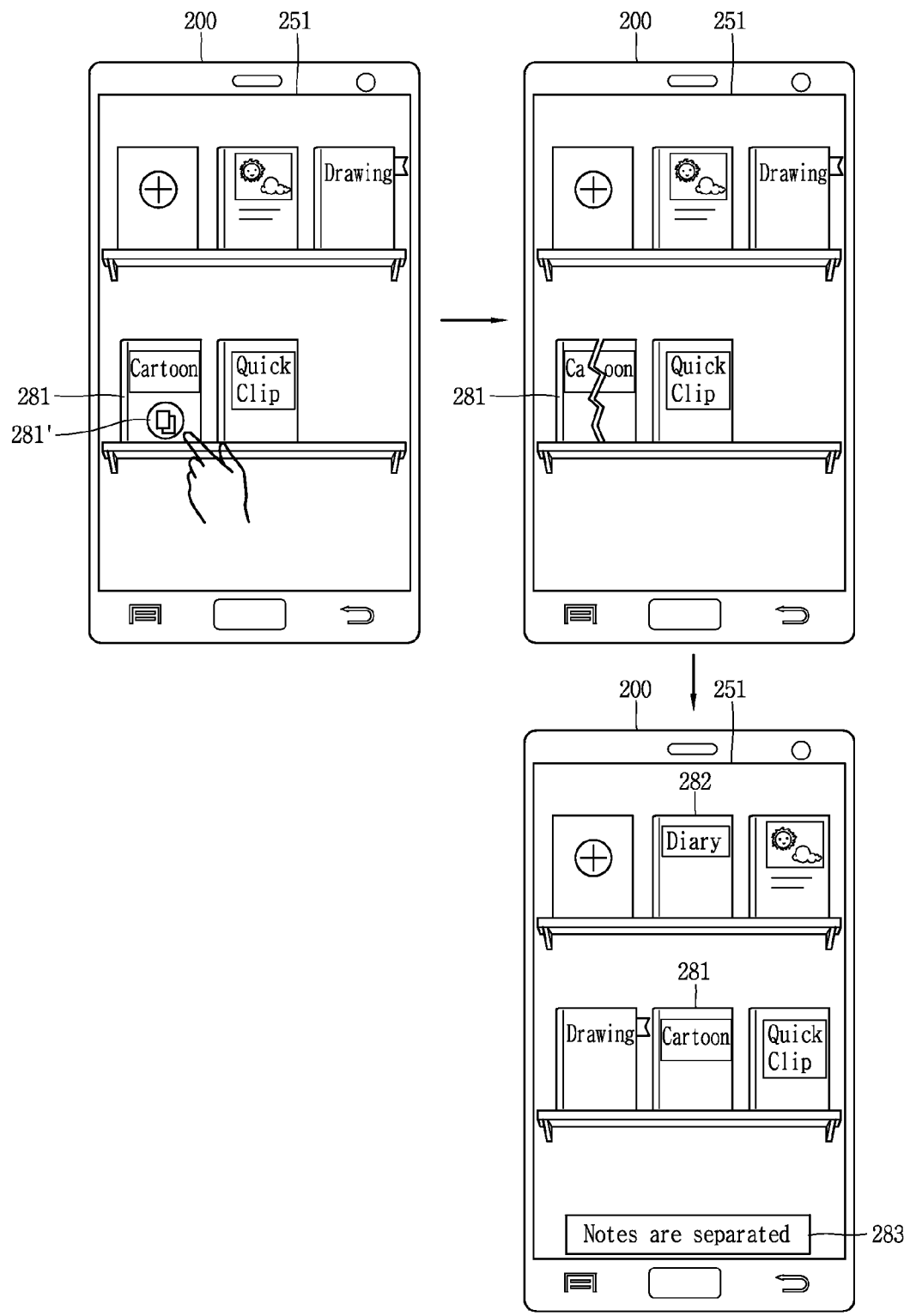

FIGS. 20 and 21 are conceptual views illustrating an operation example of the mobile terminal 200 according to FIG. 18. The mobile terminal 200 may include a display unit 251, a sensing unit 140 (refer to FIG. 1), and a controller 180 (refer to FIG. 1).

Referring to FIG. 20, an electronic bookshelf and electronic notes contained in the electronic bookshelf may be displayed on the display unit 251.

The controller 180 may execute an edit mode for editing the configuration of an electronic bookshelf based on a touch input on electronic notes. For example, when a touch input on at least two of electronic notes is sensed, the controller 180 may merge the selected electronic notes.

Specifically, as illustrated in the drawing, when either one (hereinafter, referred to as a "first electronic note 282") of electronic notes is selected and then a drag input is received in the direction of the other one (hereinafter, referred to as a "second electronic note 281"), the controller 180 may merge the first electronic note 282 into the second electronic note 281. Though not shown in the drawing, the controller 180 may merge part of the first electronic note 282 into the second electronic note 281. On the other hand, the controller 180 may display a message 283 indicating that the first and the second electronic note 282, 281 can be merged with each other on the display unit 251.

On the other hand, the controller 180 may change at least one of the size and transparency of the first electronic note 282 for a predetermined period of time. For example, as the first electronic note 282 is moved in the direction of the second electronic note 281, the first electronic note 282 may gradually become transparent, and the size thereof may be reduced.

Then, at the end of the drag input, the controller 180 may change at least one of the size and transparency of the second electronic note 281 for a predetermined period of time. For example, the controller 180 may instantaneously enlarge the size of the second electronic note 281. Furthermore, the controller 180 may merge the first electronic note 282 into the second electronic note 281, and allow the first electronic note 282 to be disappeared from the display unit 251, and change the arrangement of the other electronic notes. At this time, the controller 180 may display an object 281' and a message 283 indicating that the first and the second electronic note 282, 281 is merged into the second electronic note 281 on the display unit 251.

On the other hand, though not shown in the drawing, a page of the first electronic note 282 may be disposed in front of a page of the second electronic note 281, and a page of the second electronic note 281 may be disposed in front of a page of the first electronic note 282.

Then, referring to FIG. 21, when a touch input on the first electronic note 282 is sensed, the controller 180 may restore the merged first and the second electronic note 282, 281. At this time, as illustrated in the drawing, the controller 180 may provide an animation effect, for example, an effect of being torn apart in both directions, to the first electronic note 282. Then, the controller 180 may display the second electronic note 281 again on the display unit 251. At this time, the controller 180 may display a message 283 indicating that the first and the second electronic note 282, 281 are separated from each other on the display unit 251.

Figure 22:
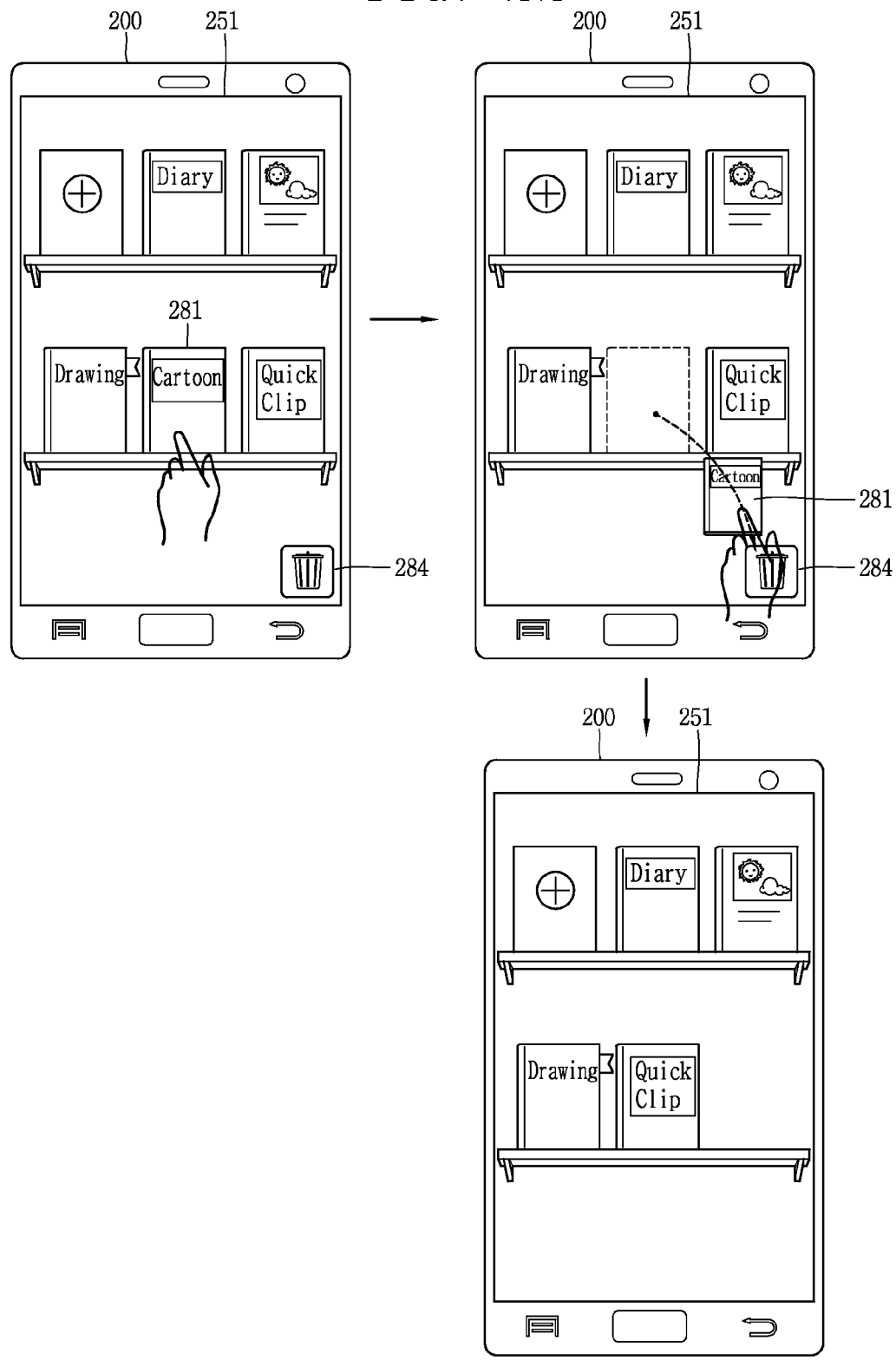
Figure 23:
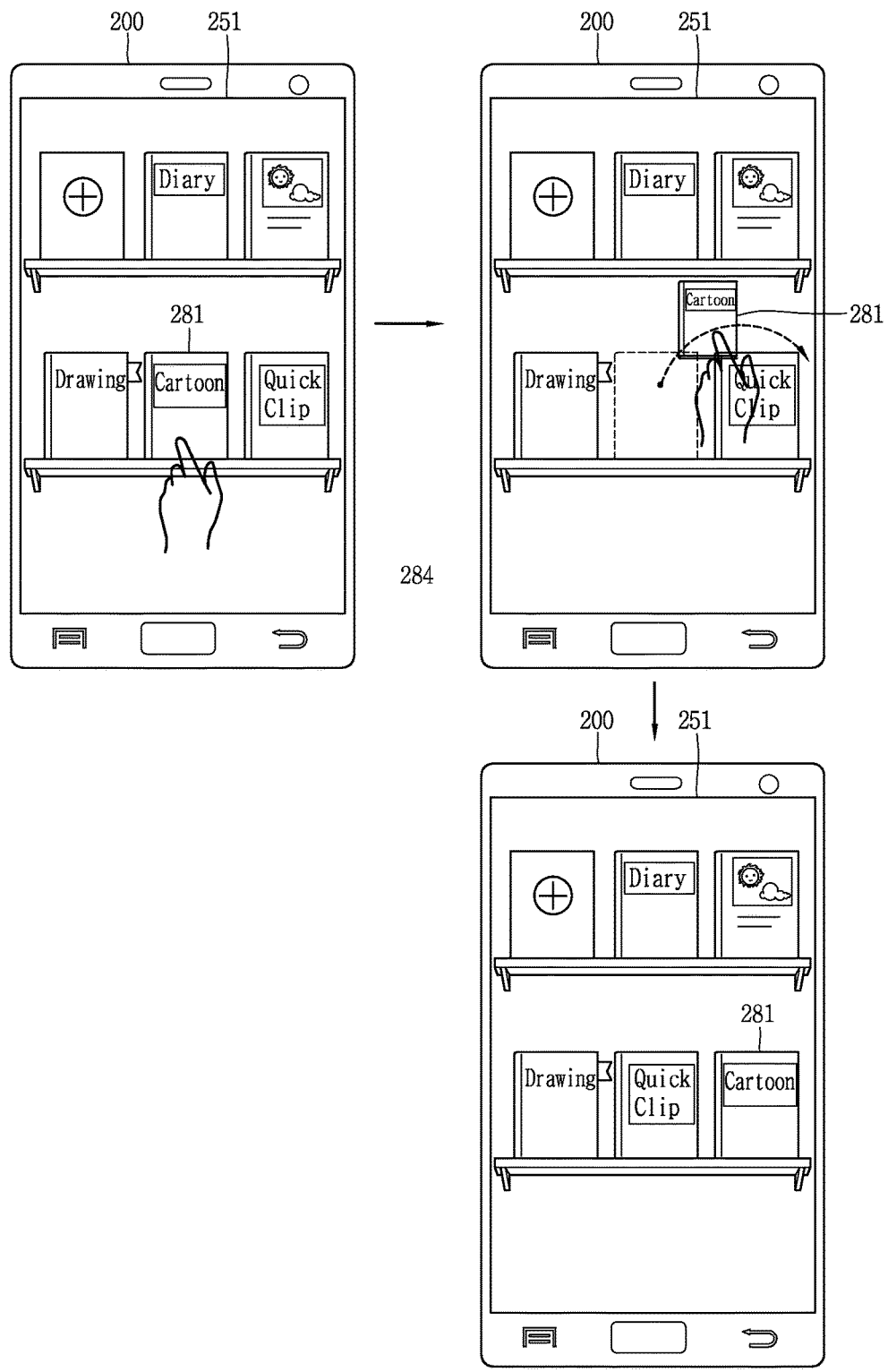

FIGS. 22 and 23 are conceptual views illustrating an operation example of the mobile terminal 200 according to FIG. 18. The mobile terminal 200 may include a display unit 251, a sensing unit 140 (refer to FIG. 1), and a controller 180 (refer to FIG. 1).

Referring to FIGS. 22 and 23, an electronic bookshelf and electronic notes contained in the electronic bookshelf may be displayed on the display unit 251.

As illustrated in FIG. 22, the controller 180 may remove the selected electronic note based on a touch input on at least one of electronic notes.

Specifically, when a touch input on at least one (hereinafter, referred to as a "first electronic note 281") of electronic notes is sensed, the controller 180 may display an object 284 corresponding to the function of removing the second electronic note 281 on the display unit 251. Then, when a drag input is received in the direction of the object 284 subsequent to selecting the second electronic note 281, the controller 180 may remove the second electronic note 281, and change the arrangement of the other electronic notes.

Furthermore, as illustrated in FIG. 23, the controller 180 may change the arrangement of electronic notes based on a touch input on at least one of electronic notes.

Specifically, the controller 180 may change at least one of the size and transparency of the second electronic note 281 while receiving a drag input in the direction of a vacant space of the electronic bookshelf subsequent to selecting any one (hereinafter, referred to as a "first electronic note 281") of the electronic notes. Then, at the end of the drag input, the controller 180 may dispose the second electronic note 281 in a vacant space of the electronic bookshelf, and change the arrangement of the other electronic notes.

Figure 24:
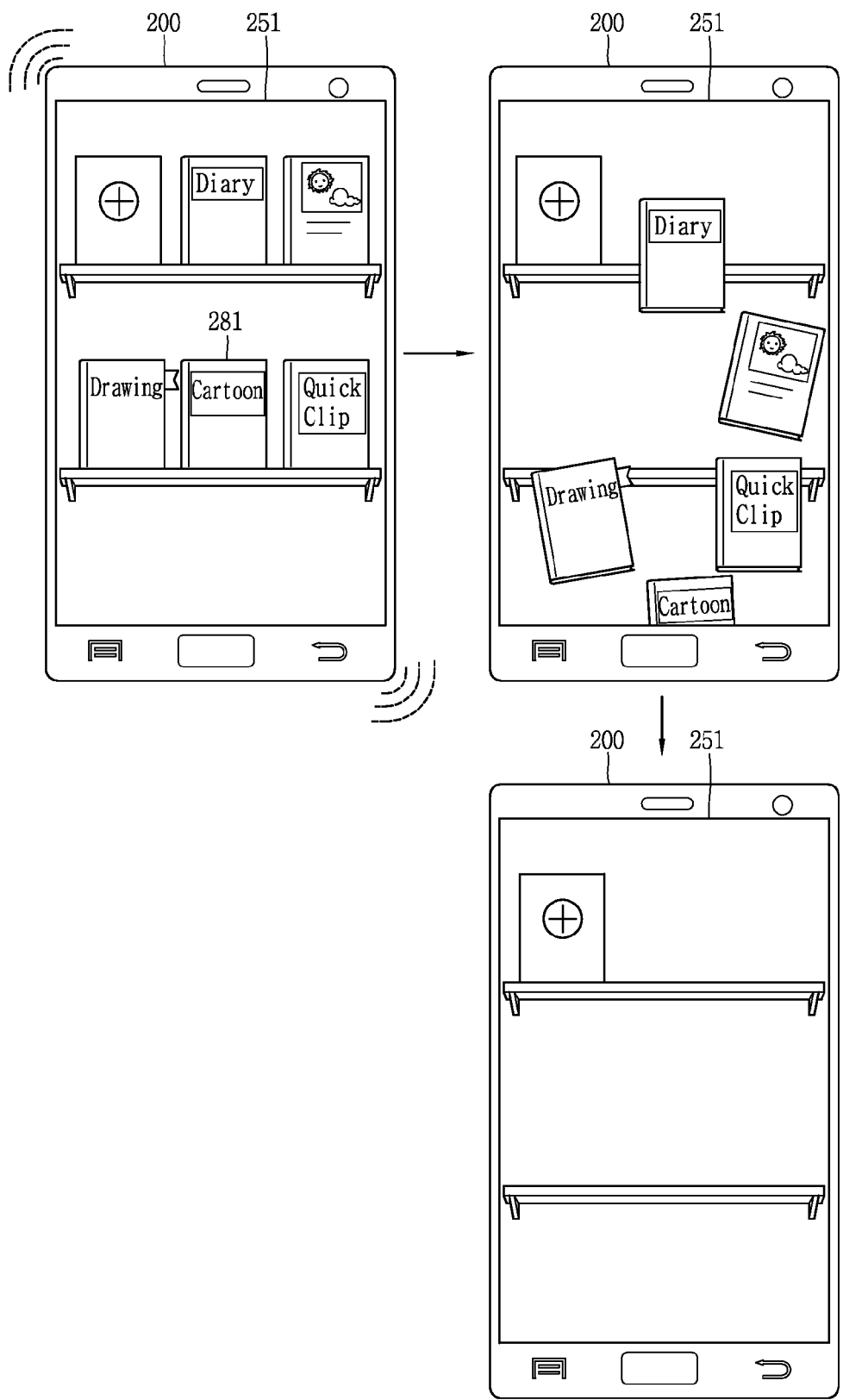
Figure 25:
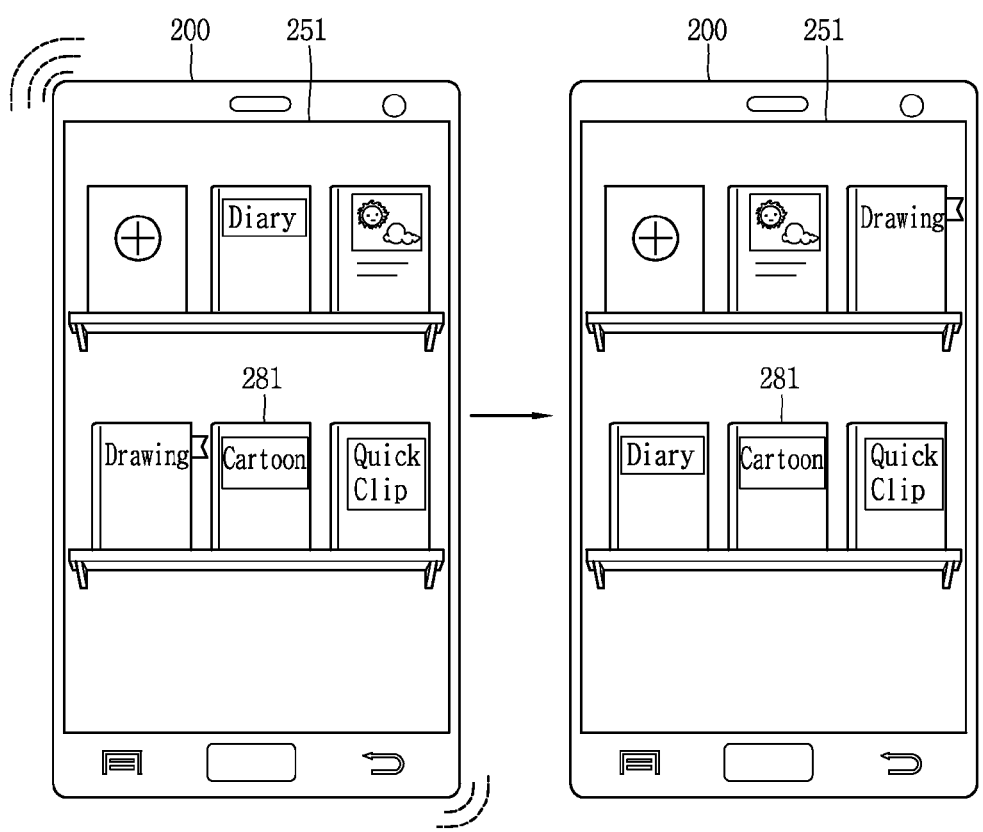

FIGS. 24 and 25 are conceptual views illustrating an operation example of the mobile terminal 200 according to FIG. 18. The mobile terminal 200 may include a display unit 251, a sensing unit 140 (refer to FIG. 1), and a controller 180 (refer to FIG. 1).

Referring to FIGS. 24 and 25, an electronic bookshelf and electronic notes contained in the electronic bookshelf may be displayed on the display unit 251.

The sensing unit 140 may sense the movement of the terminal body. Here, the movement of the terminal body may include the movement of the body performing a reciprocating motion in the top-down direction or left-right direction in addition to the movement of the body being tilted within a predetermined range of a specific angle.

When the movement of the terminal body is sensed by the sensing unit 140, the controller 180 may remove electronic notes based on the movement of the terminal body as illustrated in FIG. 24. At this time, the controller 180 may provide an animation effect in which the electronic notes are all dropped from the electronic bookshelf.

On the other hand, when the movement of the terminal body is sensed by the sensing unit 140, the controller 180 may change the arrangement of electronic notes based on the movement of the terminal body as illustrated in FIG. 25. At this time, the controller 180 may change the arrangement of electronic notes based on the attribute information of the electronic notes or the use frequency of the electronic notes. Here, the attribute information of the electronic notes may include a category of the electronic notes, a title thereof, a cover shape of the electronic notes, and the like.

Figure 26:
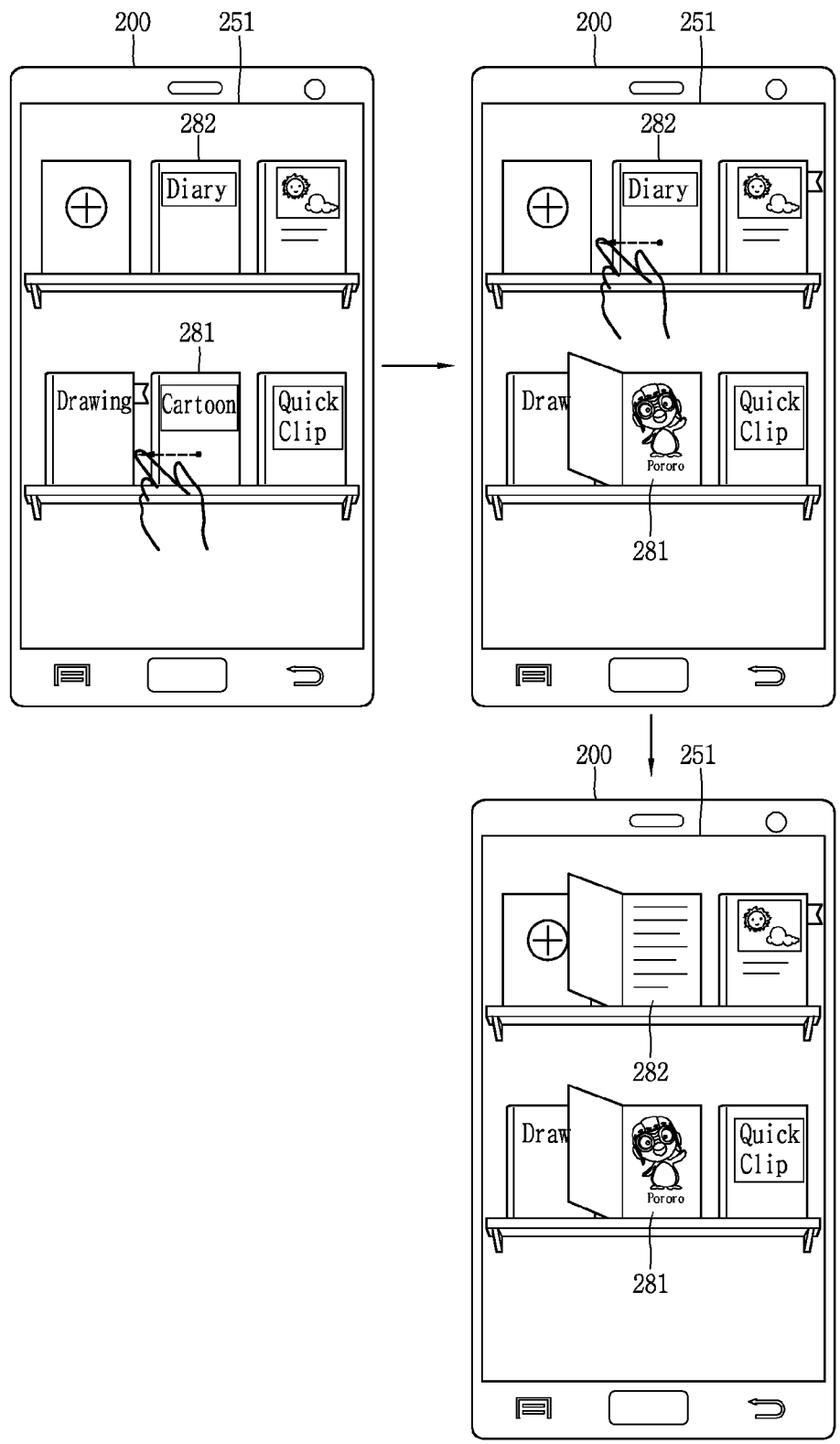
Figure 27:
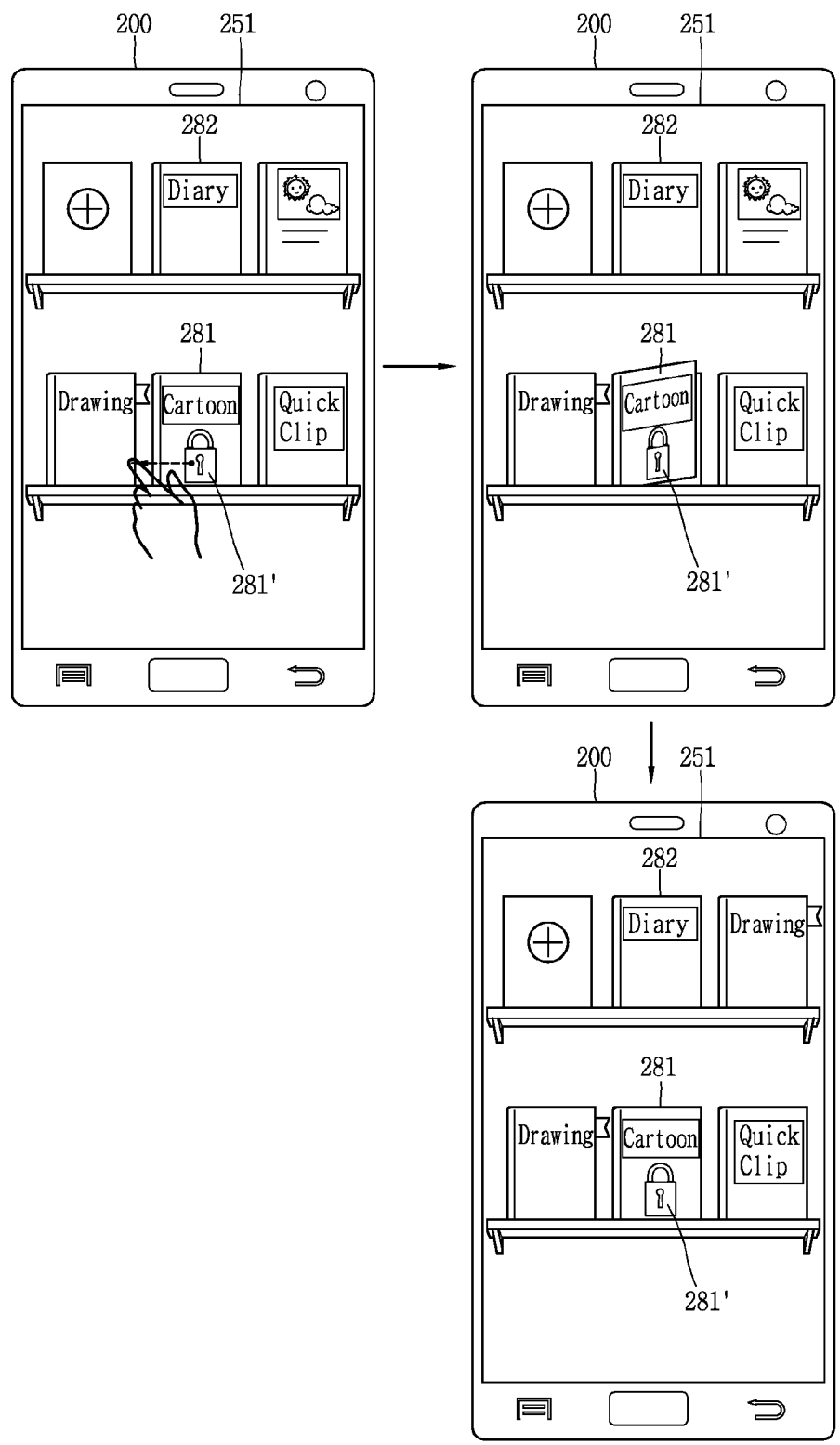

FIGS. 26 and 27 are conceptual views illustrating an operation example of the mobile terminal 200 according to FIG. 18. The mobile terminal 200 may include a display unit 251, a sensing unit 140 (refer to FIG. 1), and a controller 180 (refer to FIG. 1).

Referring to FIGS. 26 and 27, an electronic bookshelf and electronic notes contained in the electronic bookshelf may be displayed on the display unit 251.

As illustrated in FIG. 26, the controller 180 may display a page of the selected electronic note on the display unit 251 based on a touch input on at least one of electronic notes.

Specifically, when a touch input on any one (hereinafter, referred to as a "first electronic note 281") of electronic notes is sensed, the controller 180 may display a page of the first electronic note 281 within a region being displayed with the first electronic note 281. Next, when a touch input on any other one (hereinafter, referred to as a "second electronic note 282") of electronic notes is sensed, the controller 180 may display a page of the second electronic note 282 within a region being displayed with the second electronic note 282.

As a result, the user can compare pages of the first and the second electronic note 281, 282 with each other, and edit either one of the first and the second electronic note 281, 282 using the other one thereof.

On the other hand, though not shown in the drawing, when a touch input on the first electronic note 281 is sensed, the controller 180 may enlarge and display a page of the first electronic note 281 on the display unit 251.

Furthermore, though not shown in the drawing, when a touch input for turning a page on the first electronic note 281 is sensed, the controller 180 may display an animation effect corresponding to the page turn in a three-dimensional stereoscopic image. Specifically, the controller 180 may provide an animation effect of turning a cover when the cover of the first electronic note 281 is disappeared and the first page thereof is displayed. Furthermore, when a currently display page of the first electronic note 281 is disappeared and the next page thereof is displayed, the controller 180 may provide an animation effect of turning a page.

On the other hand, as illustrated in FIG. 27, when a touch input on the locked electronic note (hereinafter, referred to as a "first electronic note 281") is sensed, the controller 180 may provide an animation effect of slightly opening the first electronic note 281 and then closing it again. At this time, though not shown in the drawing, the controller 180 may display a popup window for password input on the first electronic note 281. When a preset password is input to the popup window, the controller 180 may display a page of the first electronic note 281 on the display unit 251. Meanwhile, an object 282' indicating that the first electronic note 281 is locked may be displayed thereon.

Figure 28:
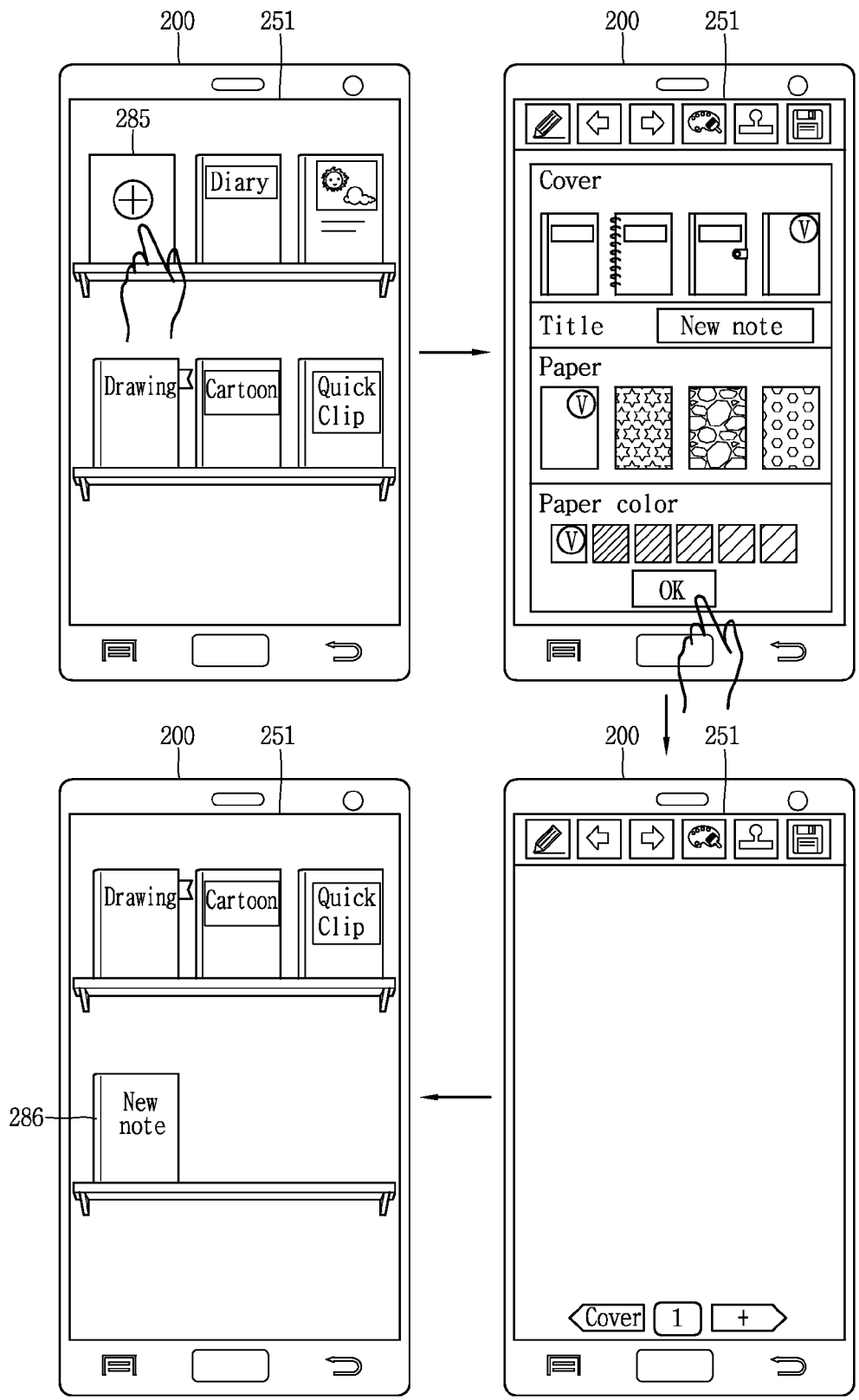
Figure 29:
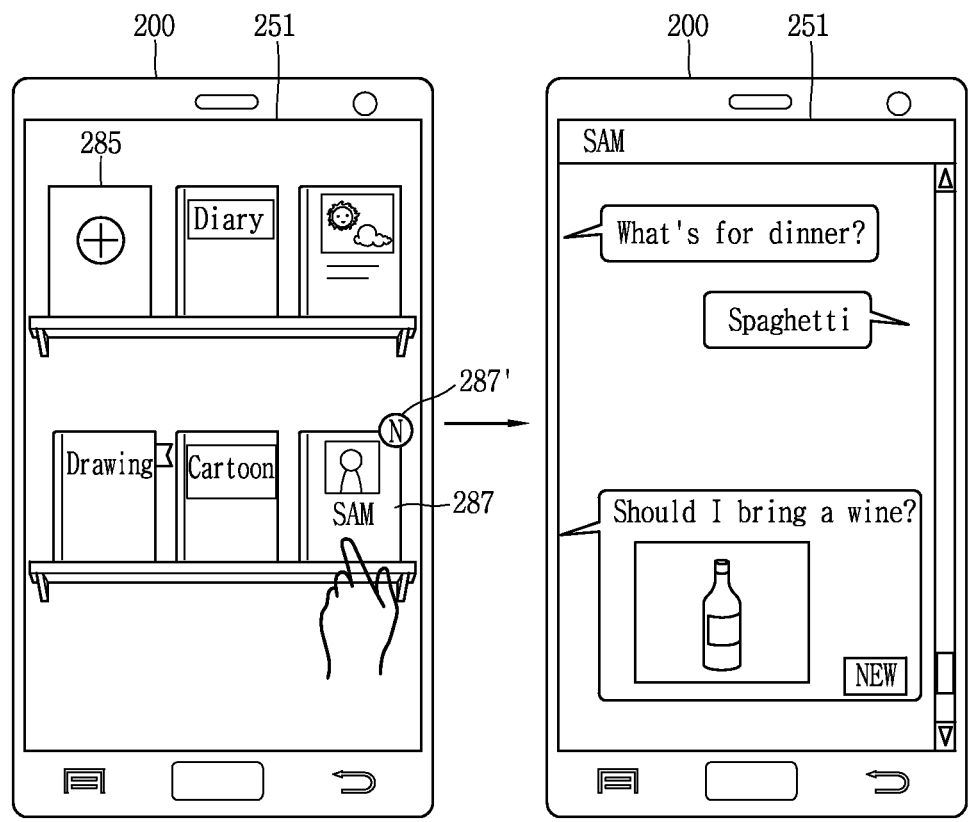

FIGS. 28 and 29 are conceptual views illustrating an operation example of the mobile terminal 200 according to FIG. 18. The mobile terminal 200 may include a display unit 251, a sensing unit 140 (refer to FIG. 1), and a controller 180 (refer to FIG. 1).

Referring to FIG. 28, an electronic bookshelf and electronic notes contained in the electronic bookshelf may be displayed on the display unit 251. Furthermore, an object 285 corresponding to the function of generating a new electronic note may be displayed on the display unit 251.

At this time, when a touch input on the object 285 is sensed, the controller 180 may generate a new electronic note. At this time, the controller 180 may display a popup window to configure the title, cover, page shape and color of the new electronic note. Then, the display unit 251 may display a page based on the information configured in the popup window.

On the other hand, the display unit 251 may display a pen tool for input along with the page. The pen tool may include icons corresponding to the character input, drawing input and eraser input functions, respectively. The controller 180 may execute a function (for example, execute a character input mode) corresponding to the selected icon when a first touch input on the icon (for example, an icon corresponding to a character input function) is sensed, and configure an option of the function corresponding to the selected icon (for example, configure a font) when a second touch input on the icon is sensed.

When a new electronic note 286 is generated, the controller 180 may dispose the new electronic note 286 on the electronic bookshelf. At this time, though not shown in the drawing, when a new electronic note is generated in a state that a predetermined number of electronic notes are contained in the electronic bookshelf, the controller 180 may generate another electronic bookshelf and dispose the new electronic note on the another electronic bookshelf.

Referring to FIG. 29, the controller 180 may generate an electronic note 287 using information received from a social network service (SNS) server. At this time, the controller 180 may display the counterpart's name, contact address or thumbnail image associated with the received information on a cover of the electronic note 287.

On the other hand, as illustrated in the drawing, when new information is received from the social network service (SNS) server, the controller 180 may display an object 287' indicating that the new information is received on a cover of the generated electronic note 287.

Furthermore, the controller 180 may generate an electronic note using transmitted and received text messages. Though not shown in the drawing, when a control command associated with the generation of an electronic note is received through the user input unit 130 (refer to FIG. 1) in a state that screen information is displayed on the display unit 251, the controller 180 may generate an electronic note using the displayed screen information.

Figure 30:
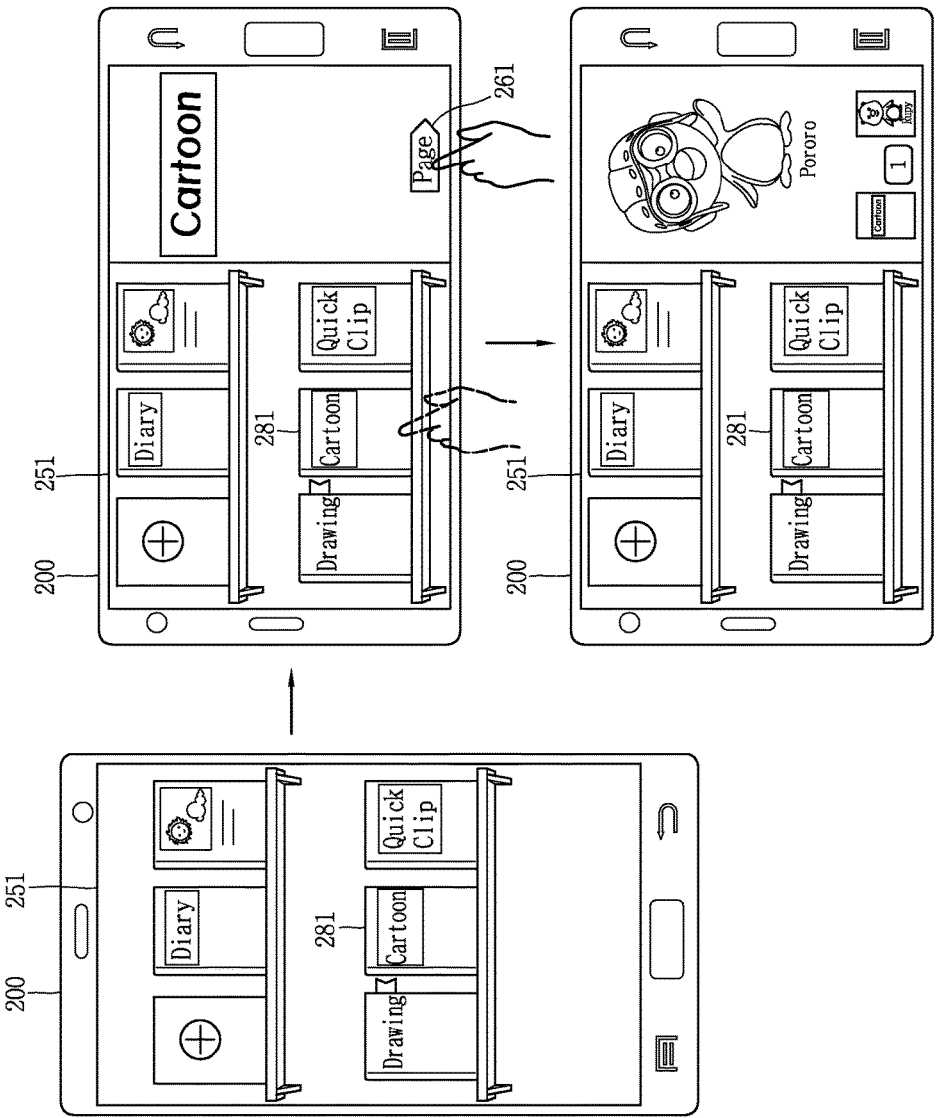

FIG. 30 is a conceptual view illustrating an operation example of the mobile terminal 200 according to FIG. 18. The mobile terminal 200 may include a display unit 251, a sensing unit 140 (refer to FIG. 1), and a controller 180 (refer to FIG. 1).

The sensing unit 140 may include a motion recognition sensor for sensing the movement of the body.

The motion recognition sensor may be mounted within the mobile terminal 200 to recognize the movement or location of the mobile terminal 200. The motion recognition sensor may include at least one of a terrestrial magnetism sensor, a gyro sensor, and an acceleration sensor.

The motion recognition sensor may sense the rotation of the body. In other words, the motion recognition sensor may detect a displacement based on the rotation of the body, namely, rotation direction and rotation angle, and generate an electrical signal using it. As a result, when a lateral surface of the body is located to face the second direction being tilted by 90 degrees from the first direction, the controller 180 may control the display unit 251 to change the display direction of the screen information displayed on the display unit 251.

At this time, as illustrated in the drawing, the controller 180 may configure a first and a second screen region. The controller 180 may display an electronic bookshelf and a cover or page of the selected electronic note 281 in the first and the second screen region, respectively. Then, when a touch input on the icon 261 corresponding to the function of displaying a page of the electronic note is sensed in a state that the cover of the electronic note 281 is displayed in the second screen region, the controller 180 may display a page of the electronic note 281 in the second screen region.

Figure 31:
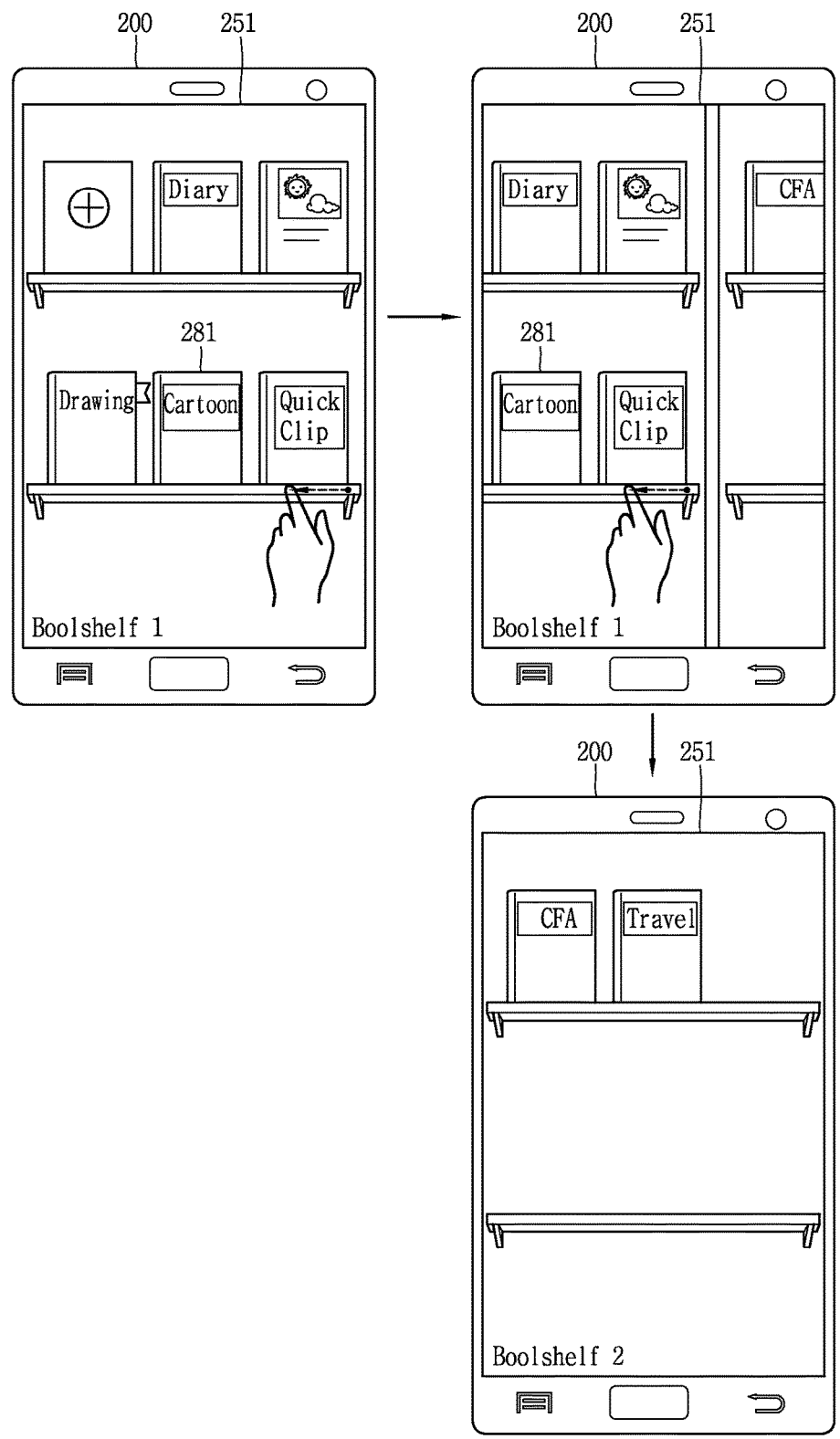

FIG. 31 is a conceptual view illustrating an operation example of the mobile terminal 200 according to FIG. 18. The mobile terminal 200 may include a display unit 251, a sensing unit 140 (refer to FIG. 1), and a controller 180 (refer to FIG. 1).

Referring to FIG. 31, an electronic bookshelf and electronic notes contained in the electronic bookshelf may be displayed on the display unit 251. At this time, as illustrated in the drawing, when a touch input on the electronic bookshelf is sensed, the controller 180 may display another electronic bookshelf on the display unit 251. When an electronic bookshelf display function is terminated and then executed again in a state that the another electronic bookshelf is displayed on the display unit 251, the display unit 251 may directly display the another electronic bookshelf.

Furthermore, though not shown in the drawing, when a touch input on the electronic bookshelf is sensed, for example, when a flick input is sensed, the controller 180 may perform scrolling for the electronic bookshelf. Accordingly, other electronic notes contained in the electronic bookshelf may be displayed on the display unit 251. At this time, when a flick input is sensed until reaching a lower end of the electronic bookshelf, the controller 180 may provide an effect of bouncing the electronic bookshelf, and display an image indicating the bottom thereof is shown at a lower portion of the electronic bookshelf.

On the other hand, though not shown in the drawing, when a new electronic note is generated in a state that a predetermined number of electronic notes are contained in the electronic bookshelf, the controller 180 may generated another electronic bookshelf, and dispose the new electronic note on the another electronic bookshelf.

Furthermore, though not shown in the drawing, when a touch input on the electronic bookshelf is sensed, the controller 180 may change the display shape of electronic notes. For example, the controller 180 may display an electronic note on the display unit 251 such that a front cover of the electronic note faces the front surface thereof, or display an electronic note on the display unit 251 such that a front cover of the electronic note faces the lateral surface thereof, namely in such a manner that the electronic note is placed on the electronic bookshelf.

Furthermore, according to an embodiment of present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
a touch screen configured to be touch sensitive; and
a controller configured to:
control the touch screen to display an electronic note comprising at least one note page,
control the touch screen to display a first note page of the electronic note, at least one function icon for inputting note information and an icon comprising a page number information of the first note page currently displayed on the touch screen,
receive a first touch input applied to the icon comprising the page number information of the first note page currently displayed on the touch screen,
control the touch screen to display one or more thumbnail images corresponding to each of the at least one note page in response to the first touch input applied to the icon comprising the page number information of the first note page currently displayed on the touch screen,
wherein the one or more thumbnail images correspond to each of the first note page, at least one of a second note page that is a previous page of the first note page, and a third note page that is a next page of the first note page currently displayed on the touch screen, and
control the touch screen to convert the first note page into a second note page if a second touch input is applied to a thumbnail image corresponding to the second note page different from the first note page among the one or more thumbnail images,
wherein the page number information of the first note page comprised in the icon is changed into page number information of the second note page if the second note page is displayed on the touch screen in response to the conversion of the first note page into the second note page.

2. The mobile terminal of claim 1,
wherein the at least one function icon and the icon are overlapped with the first note page or the second note page,
wherein an execution of an edit mode related to the electronic note is allowed based on a user's selection after the one or more thumbnail images are displayed on the touch screen, and
wherein if the second touch input is applied to a thumbnail image corresponding to the first note page among the one or more thumbnail images, the controller maintains the displaying of the first note page.

3. The mobile terminal of claim 1, wherein the controller provides a highlighting effect on a thumbnail image corresponding to the first note page among the one or more thumbnail images if the first note page is displayed on the touch screen.

4. The mobile terminal of claim 3, wherein if the first note page is converted into the second note page in response to the second touch input, the controller highlights the thumbnail image corresponding to the second note page and stops the highlight effect for the first note page.

5. The mobile terminal of claim 2, wherein the edit mode related to the electronic note is executed based on the user's selection, and
wherein the controller edits at least one note page comprised in the electronic note based on editing at least one thumbnail among the one or more thumbnail image in the edit mode.

6. The mobile terminal of claim 5, wherein if the at least one thumbnail image among the one or more thumbnail images is deleted in the edit mode, the controller deletes one or more note pages corresponding to the deleted thumbnail image.

7. The mobile terminal of claim 5, wherein if an arrangement of the one or more thumbnail images is changed in the edit mode, the controller changes an arrangement of the at least one note page comprised in the electronic note.

8. The mobile terminal of claim 7, wherein the controller changes arrangement of the one or more thumbnail images in response to dragging a thumbnail image to an empty space between different thumbnail images.

9. The mobile terminal of claim 1, wherein the icon comprises information related to total number of pages of the electron note.

10. The mobile terminal of claim 1, wherein if the one or more thumbnail images are displayed on the touch screen in response to the first touch input, the controller entirely displays three thumbnail images and partially displays one thumbnail image.

11. The mobile terminal of claim 1, wherein the controller scrolls one or more thumbnail images in response to a flick touch input applied to at least one thumbnail image among the one or more thumbnail images.

* * * * *